US009936178B2

(12) United States Patent
Kim et al.

(10) Patent No.: US 9,936,178 B2
(45) Date of Patent: Apr. 3, 2018

(54) THREE-DIMENSIONAL IMAGE DISPLAY APPARATUS USING LASER BEAM SCANNING PROJECTION OPTICAL SYSTEMS

(71) Applicant: KOREA INSTITUTE OF SCIENCE AND TECHNOLOGY, Seoul (KR)

(72) Inventors: Sung Kyu Kim, Seoul (KR); Dong Gyu Lee, Seoul (KR); Ki Hyuk Yoon, Seoul (KR); Hyoung Lee, Pohang-Si (KR); Jae Won Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 288 days.

(21) Appl. No.: 14/810,828

(22) Filed: Jul. 28, 2015

(65) Prior Publication Data

US 2016/0057409 A1 Feb. 25, 2016

(30) Foreign Application Priority Data

Aug. 19, 2014 (KR) .................. 10-2014-0107741

(51) Int. Cl.
*G03B 35/20* (2006.01)
*H04N 9/31* (2006.01)
(Continued)

(52) U.S. Cl.
CPC ......... *H04N 9/3164* (2013.01); *G02B 26/101* (2013.01); *G02B 27/2264* (2013.01);
(Continued)

(58) Field of Classification Search
CPC .............. G02B 26/101; G02B 27/2264; G02B 27/141; G03B 35/20; H04N 13/0409;
(Continued)

(56) References Cited

U.S. PATENT DOCUMENTS

| 2012/0105432 A1* | 5/2012 | Liao ................. H04N 3/08 345/419 |
| 2013/0083292 A1 | 4/2013 | Silverstein |
| 2014/0035959 A1* | 2/2014 | Lapstun ............ H04N 13/0402 345/690 |

FOREIGN PATENT DOCUMENTS

| JP | 2012-098341 A | 5/2012 |
| JP | 2013-235224 A | 11/2013 |

(Continued)

OTHER PUBLICATIONS

Korean Office Action Appln. No. 10-2014-0107741; dated Aug. 19, 2014.

*Primary Examiner* — Sultan Chowdhury
*Assistant Examiner* — Magda Cruz
(74) *Attorney, Agent, or Firm* — Ladas & Parry LLP; Loren K. Thompson

(57) ABSTRACT

Provided is a three-dimensional (3D) image display apparatus using laser beam scanning (LBS) projection optical systems. The 3D image display apparatus includes a plurality of LBS projection optical systems arrayed in horizontal and vertical directions, an input unit through which a 3D image signal is input, and an image signal controller configured to distribute the 3D image signal input through the input unit to the LBS projection optical systems. Each of the arrayed LBS projection optical systems has a beam-projection center point for outputting light to an outside of the LBS projection optical system, and an image projected from the beam-projection center point is a horizontal-parallax image based on the beam-projection center point.

35 Claims, 43 Drawing Sheets

(51) Int. Cl.
    *H04N 13/04*         (2006.01)
    *G02B 26/10*         (2006.01)
    *G02B 27/22*         (2018.01)
    *G02B 27/14*         (2006.01)

(52) U.S. Cl.
    CPC ........... *G03B 35/20* (2013.01); *H04N 9/3129*
        (2013.01); *H04N 9/3147* (2013.01); *H04N*
        *13/0409* (2013.01); *H04N 13/0459* (2013.01);
        *G02B 27/141* (2013.01)

(58) Field of Classification Search
    CPC ............. H04N 13/0459; H04N 9/3129; H04N
        9/3147; H04N 9/3164
    See application file for complete search history.

(56) References Cited

FOREIGN PATENT DOCUMENTS

| WO | 01/88598 A2 | 11/2001 |
|---|---|---|
| WO | 2005/117458 A2 | 12/2005 |

\* cited by examiner

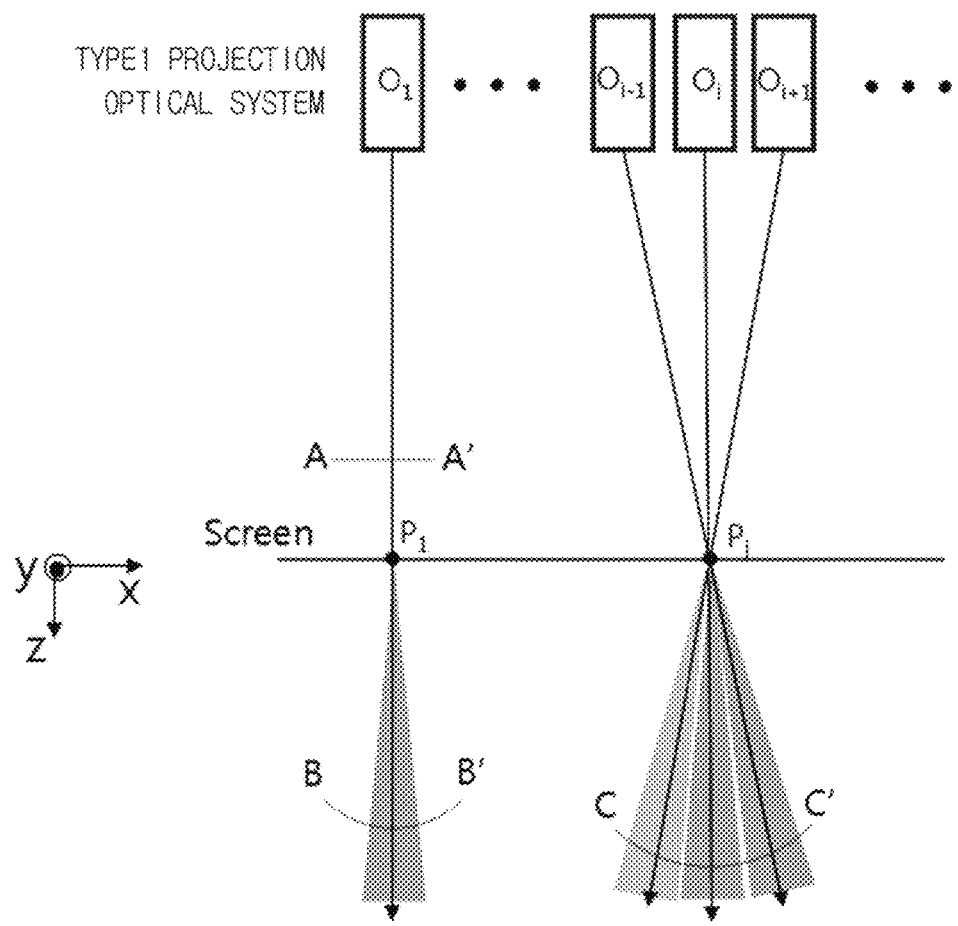

FIG. 7B
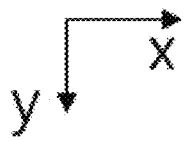
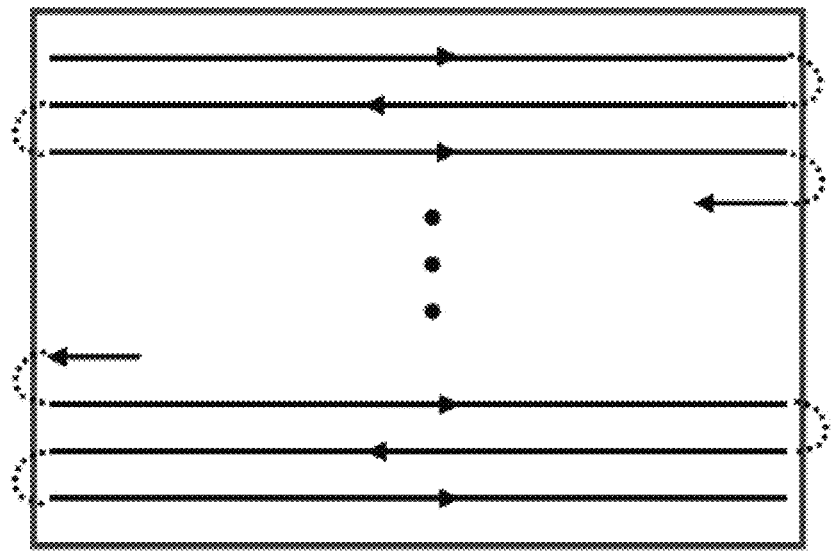

FIRST POSITION

SECOND POSITION

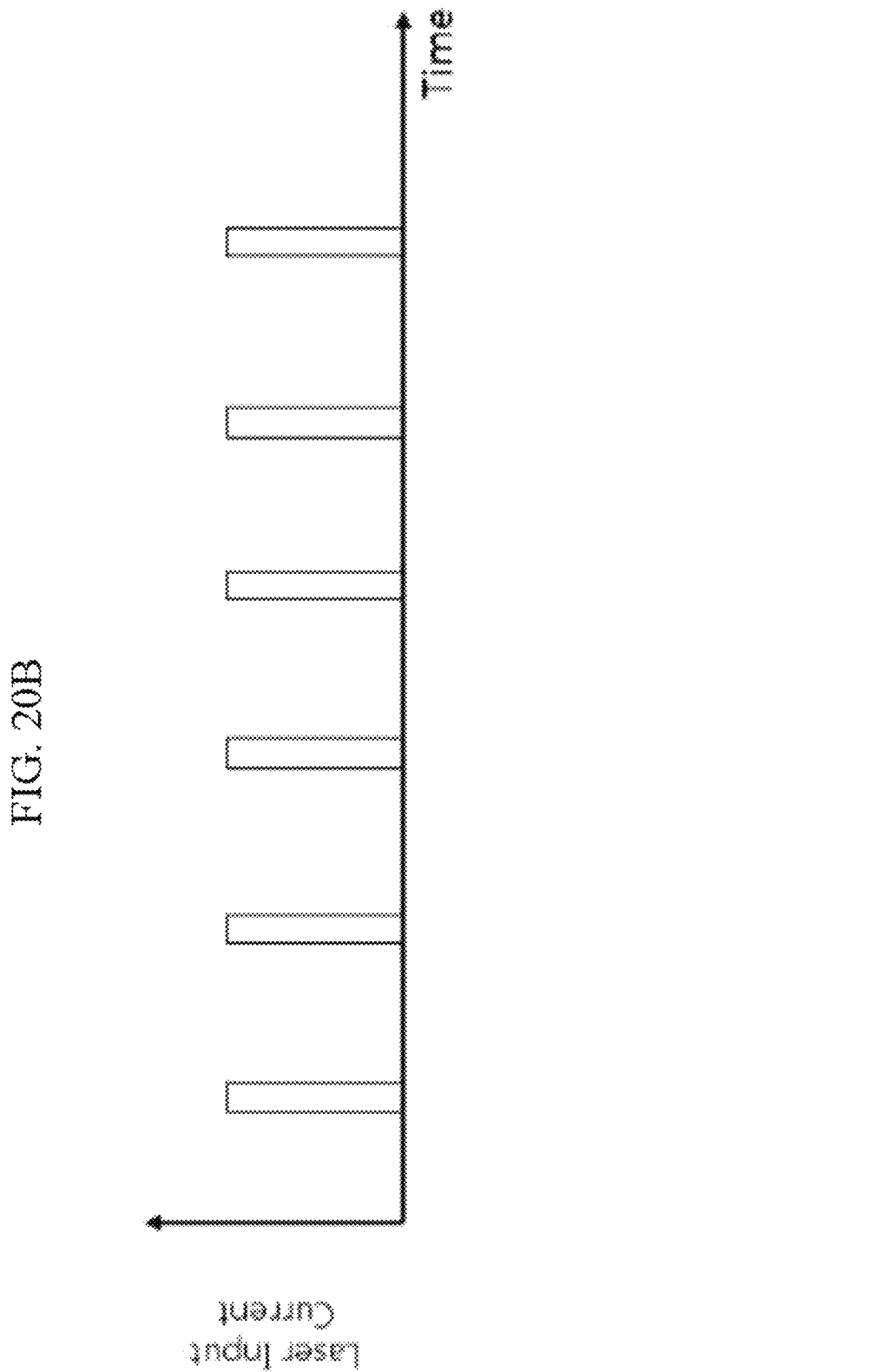

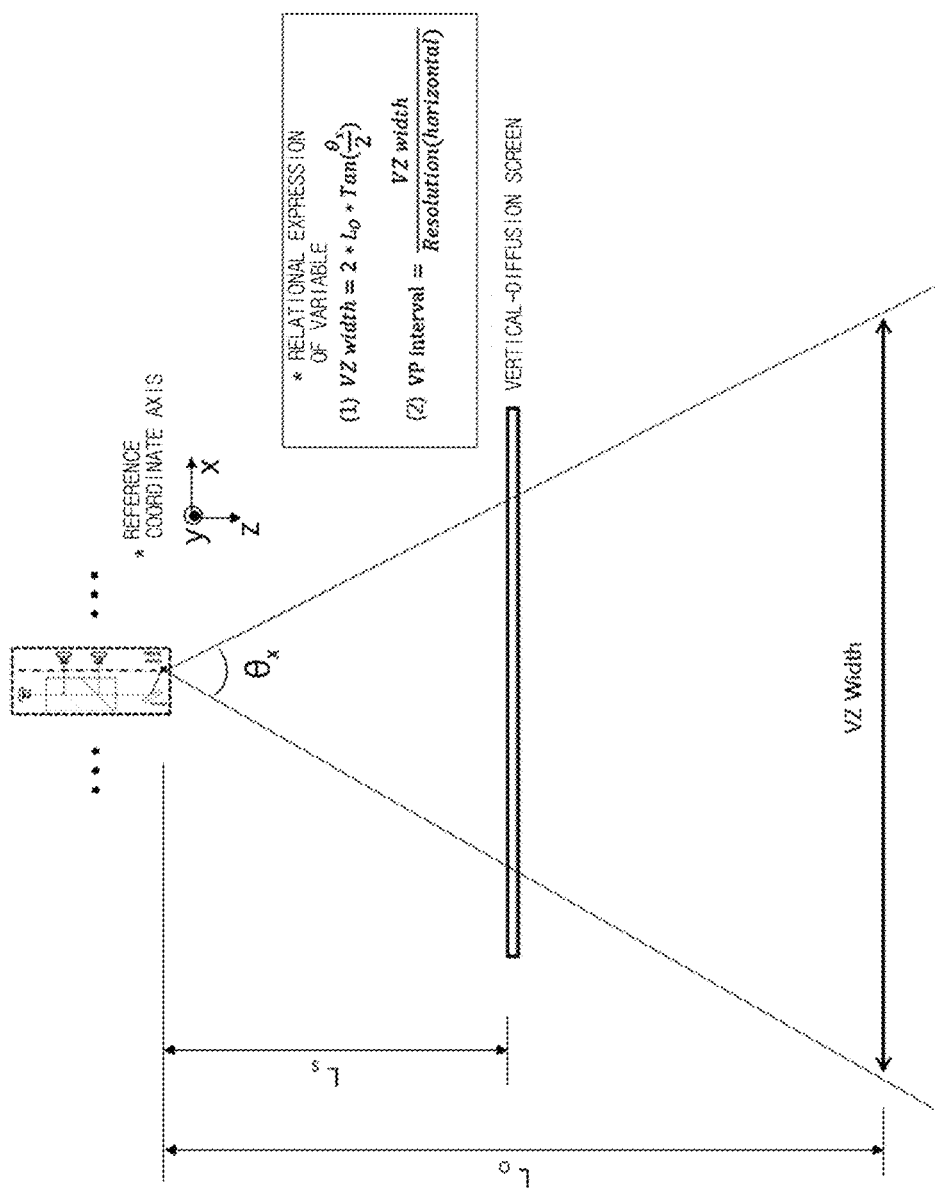

➢ CHARACTERISTICS OF LBS PROJECTION OPTICAL SYSTEM
- *Resolution: 848 (H) x 480 (V)*
- $\theta_x$ = 45 degree ≻CHARACTERISTICS OF LBS PROJECTION OPTICAL SYSTEM
- *Resolution: 848 (H) x 480 (V)*
- $\theta_x$ = 45 degree

THREE-DIMENSIONAL IMAGE DISPLAY APPARATUS USING LASER BEAM SCANNING PROJECTION OPTICAL SYSTEMS

CROSS-REFERENCE TO RELATED APPLICATION

This application claims priority to and the benefit of Korean Patent Application No. 2014-0107741, filed on Aug. 19, 2014, the disclosure of which is incorporated herein by reference in its entirety.

BACKGROUND

1. Field of the Invention

The present invention relates to an auto-stereoscopic three-dimensional (3D) image display apparatus, and more particularly, to an auto-stereoscopic 3D image display apparatus for many persons in which each of many laser beam scanning (LBS) projection optical systems horizontally and vertically arranged in a two-dimensional (2D) array becomes one 3D pixel for forming a 3D viewing zone to generate a full-parallax image or each of many LBS projection optical systems horizontally and vertically arranged in a 2D array or horizontally arranged in an one-dimensional (1D) array becomes one 3D pixel line for forming a 3D viewing zone to generate a horizontal parallax image, so that the quality of a 3D image is slightly degraded even when a viewer moves in the depth direction within a predetermined viewer range in which it is possible to view a 3D image from a screen disposed in front of many LBS projection optical systems arranged in a 2D array or a 1D array.

2. Discussion of Related Art

In general, image display apparatuses that implement a 3D image by providing a parallax image are roughly classified into a stereoscopic display type and an auto-stereoscopic display type.

Since a 3D image display apparatus of the stereoscopic display type provides only two viewpoint images corresponding to both eyes, it is not possible to provide natural motion parallax, etc. according to movement of a viewer's position, and it is inconvenient to wear special glasses such as polarized glasses. However, many viewers at fixed positions can view a clear 3D image at many positions, and thus the 3D image display apparatus of the stereoscopic display type has been commercialized for televisions (TVs) and movie theaters.

On the other hand, 3D image display apparatuses of the auto-stereoscopic display type that enable viewers to view a 3D image without special glasses and provide motion parallax when a viewer moves within a predetermined range (3D viewing angle) have several subtypes. Typically, 3D image display apparatuses of the auto-stereoscopic display type may be subdivided into a type of using a flat panel display (FPD) and a type of using projection optical systems or projection optics.

In a 3D image display apparatus using an FPD, a parallax barrier or a lenticular lens that is a parallax separation means is disposed on the front side of the FPD to mainly separate spatial 3D images, and an appropriate viewpoint image is disposed on pixels of the FPD so that a 3D image may be seen.

A 3D image display apparatus using projection optical systems displays a 3D image using a plurality of projection optical systems and a screen, and may be classified as a multi-view type, an integral photography (IP) type, or an integral floating type according to an implementation method.

Type 1 conceptual diagrams of a 3D image display apparatus using a plurality of projection optical systems and related to the present invention among the 3D image display apparatuses of the auto-stereoscopic display type are shown in FIGS. 1A, 1B and 2 (see International Patent Publication No. WO 01/88598).

FIGS. 1A and 1B are top-down views of a 3D image display apparatus using projection optical systems, and the plurality of projection optical systems are arranged in a 2D array on the x-y plane as shown in FIG. 2.

The 3D system provides only horizontal parallax information. A screen disposed as shown in FIGS. 1A and 1B are formed of an anisotropic diffuser in which vertical diffusion mainly occurs and minor diffusion is provided in the horizontal direction to improve viewing-zone characteristics.

On the screen shown in FIG. 2, $P_{ij}$ and $P_j$ denote a unit 3D pixel and a unit 3D pixel line, respectively. These unit 3D pixel and unit 3D pixel line have the same concept as used for an auto-stereoscopic 3D image display apparatus using an FPD.

In a 3D image display apparatus using projection optical systems, unit 3D pixels are the minimum units of a screen including 3D image information emitted from a plurality of projection optical systems. The 3D pixels of the screen split image information having parallax information transferred from the respective projection optical systems in the horizontal direction, thereby forming viewing zones. In this way, the 3D pixels regularly arranged on the screen enable a viewer in front of the screen to view a 3D image.

Since the 3D image display apparatus that provides only a horizontal-parallax image as mentioned above provides no vertical parallax, it is possible to select unit 3D pixels providing the same horizontal-parallax image from the arrangement of the first row to the last row in the screen. A 3D pixel line providing such a same parallax image on the screen is referred to as a unit 3D pixel line.

According to the disposition of the plurality of projection optical systems, such a unit 3D pixel line may be formed in the y direction (the direction normal to the screen), or formed diagonal to the y direction. $P_j$ of FIGS. 1A, 1B and 2 exemplify a unit 3D pixel line formed normal to the screen as an example.

Here, the number of 3D pixels on the screen may vary according to the disposition of the plurality of projection optical systems, but the maximum number becomes the product of the number of horizontal pixels and the number of vertical pixels of each projection optical system in a disposition for making the image positions of the plurality of projection optical systems coincide with each other.

In addition, the maximum number of viewing zones displayable by each unit 3D pixel on the screen becomes the same as the number of projection optical systems used in a system (when parallax images are provided by all projection optical systems used for all unit 3D pixels on the screen).

For example, a 3D system using 200 projection optical systems provides a maximum of 200 pieces of parallax information per unit 3D pixel. Holografika (Hungary) that suggested such a 3D image display apparatus using a plurality of projection optical systems for the first time and developed a commercialized product refers to the 3D image display apparatus as a Light Field™ system.

The quality of a 3D image of a 3D image display apparatus using existing projection optical systems as shown in FIGS. 1A, 1B and 2 and characteristics of viewing zones formed by a unit 3D pixel or a unit 3D pixel line having a direct influence on the expressible depth of a 3D image on a screen are expressed as shown in FIGS. 3A, 3B and 3C.

A line shown as a straight line on an A-A' cross section in FIG. 1A for convenience indicates a ray of light including one piece of image information among rays of light (each projection optical system generates rays of light displaying as many pieces of image information as the product of the number of horizontal pixels and the number of vertical pixels) displaying a whole image and generated from one type-1 projection optical system.

One image information ray of light expressed as such a straight line may be implemented by a type-1 projection optical system shown in FIG. 1B and ideally, rays of light including image information of an image display apparatus included in the projection optical system converge to one adjacent point in front of the projection optical system and diverge at a predetermined angle. The distribution of intensity of light displaying such image information on the A-A' cross section has the Gaussian form as shown in FIGS. 3A, 3B and 3C.

The screen of FIGS. 1A and 1B or FIG. 2 mainly serves as a vertical diffuser, but has a minor diffusion effect in the horizontal direction, thereby extending the distribution of intensity of one image information ray of light having passed through the screen according to an angle with respect to a B-B' cross section.

However, in this case, the distribution of intensity of rays of light generated by different projection optical systems and forming adjacent viewing zones on the same 3D pixel (or 3D pixel line) on the screen is not uniform, and the adjacent viewing zones generated from the same 3D pixel overlap each other.

Such non-uniformity of brightness of a viewing zone including viewpoint image information and crosstalk occurring due to the overlap of adjacent viewing zones mainly cause a viewer to feel tired of viewing a 3D image through such a system. Also, the non-uniformity of brightness of a viewing zone and the crosstalk limit depth perception of a 3D image expressible through the system.

To reduce the degradation of the quality of a 3D image of a 3D image display apparatus using type-1 projection optical systems resulting from viewing zone characteristics as shown in FIGS. 3A, 3B and 3C, the same applicant, Holografika, filed an improved patent application (International Patent Publication No. WO 2005/117458) for a 3D image display apparatus using type-2 projection optical systems.

The basic structure and the principle of forming a viewing zone illustrated in FIG. 4A is the same as the existing system illustrated in FIG. 1A. The improved 3D system differs in that the used projection optical systems image information of the image display apparatus included in the projection optical systems on a screen through second lenses, and ideally, a used screen is a vertical diffuser having a diffusion characteristic in the vertical direction only.

The improved 3D system using such type-2 projection optical systems is capable of making the distribution of light, which is generated from one projection optical system and forms one viewing zone of unit 3D pixels in the screen, identical before and after being incident on the screen, that is, at an A-A' position and a B-B' position.

By appropriately adjusting the intervals between adjacent projection optical systems based on such a characteristic, it is possible to minimize a crosstalk area between adjacent viewing zones among a plurality of viewing zones for displaying viewpoint information generated by one unit 3D pixel (or pixel line) on the screen as shown in FIG. 5, and to maintain the uniformity of light intensity in the same viewing zone.

However, in such a 3D system using type-2 projection optical systems, it is possible to use a screen having only the vertical diffusion characteristic compared to a 3D system using type-1 projection optical systems. The intervals between projection optical systems may be adjusted to adjust intervals between viewing zones formed in the horizontal direction by unit 3D pixels (or 3D pixel lines) formed on a screen, so that the uniformity of brightness distribution in a whole image may be increased. However, like the 3D system using type-1 projection optical systems, it is difficult to reduce crosstalk between adjacent viewing zones and adjust the intervals so as to maintain uniform brightness according to an angle in one viewing zone.

For example, even when viewing zones formed on 3D pixels (or 3D pixel lines) on the screen do not have the ideal distribution of FIG. 5, the brightness distribution in a whole image may be uniformly formed without depending on an angle as shown in FIG. 6 by appropriately adjusting the horizontal intervals between the type-2 projection optical systems in consideration of the distribution of respective viewing zones.

However, when the viewing zones do not have an ideal distribution according to an angle as shown in FIG. 5, image information of an adjacent viewing zone is seen even at the central-angle position of each viewing zone (e.g., A position in FIG. 6), thus causing a viewer who views a 3D image to feel tired.

Therefore, with the two kinds of existing technology, it is not easy to ensure the uniformity of the distribution of viewing zones while minimizing crosstalk between adjacent viewing zones formed on unit 3D pixels (or pixel lines) in a screen.

In addition, according to the above-described existing technology, when the maximum resolution of a 3D viewpoint image viewed at the position of a viewer becomes the same as the resolution of each projection optical system, the maximum number of viewpoints representing the amount of 3D viewpoint information expressible according to 3D pixels (or pixel lines) becomes the same as the number of projection optical systems used in a system. Therefore, the system is advantageous when the number of viewpoints expressible according to 3D pixels is small, whereas the volume of the system increases too much due to the volume of projection optical systems used to increase the number of viewpoints.

In particular, to manufacture a 3D system for hundreds of viewpoints in this way, respective viewpoint images generated by hundreds of projection optical systems are required to be arranged and provided to the corresponding 3D pixel positions on a screen. However, it is difficult to display images of hundreds of projection optical systems arranged in a 2D array on a single screen without distortion.

According to a 3D system using type-2 projection optical systems, an image is cleared formed at a position apart from each projection optical system by a determined focal length, and thus it is particularly not easy to adjust a screen size using the determined projection optical systems. Also, a relatively long projection distance is necessary to form an image on a screen, and it is difficult to form a clear 3D pixel line in the whole area of a single screen using projection optical systems in a 2D array.

SUMMARY OF THE INVENTION

The present invention is directed to providing a three-dimensional (3D) image display apparatus that uses an array of laser beam scanning (LBS) projection optical systems in each of which a light output unit is configured to be a unit 3D pixel (or pixel line), and thus has relaxed limitations on space and size, provides hundreds of viewpoint images or more, uniformizes light intensity of viewing zones providing the respective viewpoint images, forms the same picture size on a screen with a shorter projection distance than existing projection optical systems, and minimizes crosstalk between adjacent viewpoints, so that many viewers are able to view a clear 3D image without special glasses even during a 3D spatial movement within a view range in front of the screen.

According to an aspect of the present invention, there is provided a 3D image display apparatus using LBS projection optical systems, including: a plurality of LBS projection optical systems arrayed in horizontal and vertical directions; an input unit through which a 3D image signal is input; and an image signal controller configured to distribute the 3D image signal input through the input unit to the LBS projection optical systems. Each of the arrayed LBS projection optical systems has a beam-projection center point for outputting light to an outside of the LBS projection optical system, and an image projected from the beam-projection center point is a horizontal-parallax image based on the beam-projection center point.

Here, beam-projection center points of the respective LBS projection optical systems may be arrayed at predetermined intervals in the horizontal direction (x-axis direction) to determine a horizontal size of a 3D image picture.

Preferably, the 3D image display apparatus may further include a screen disposed apart from the array of the plurality of LBS projection optical systems by a predetermined distance in a depth direction (z-axis direction) and having a vertical-direction (y-axis direction) diffusion characteristic. The screen may determine a vertical size of the 3D image picture.

Preferably, the screen may have a minor diffusion characteristic in the horizontal direction (x-axis direction).

Preferably, the beam-projection center points of the respective LBS projection optical systems may be arrayed at predetermined intervals in the vertical direction (y-axis direction), and a full-parallax image may be output from the beam-projection center points of the respective LBS projection optical systems.

Preferably, the 3D image display apparatus may further include a screen disposed a predetermined distance away from the array of the plurality of LBS projection optical systems in a depth direction (z-axis direction) and having a minor diffusion characteristic in the vertical and horizontal directions.

Preferably, horizontal-direction (x-axis direction) center optical axes of the beam-projection center points of the plurality of LBS projection optical systems may be disposed in a direction (z-axis direction) normal to the screen.

Preferably, horizontal-direction (x-axis direction) center optical axes of the beam-projection center points of the plurality of LBS projection optical systems may be disposed to cross a horizontal center of the screen.

Preferably, horizontal-direction (x-axis direction) center optical axes of the beam-projection center points of the plurality of LBS projection optical systems may be disposed to cross a horizontal center of the screen and equalize distances between the beam-projection center points of the plurality of LBS projection optical systems and the horizontal center of the screen.

Preferably, vertical center axes of the beam-projection center points of the plurality of LBS projection optical systems may be disposed to cross a vertical center of the screen.

Preferably, shapes of projection images formed on the screen from the beam-projection center points of the respective LBS projection optical systems may be adjusted to be quadrangles by controlling vertical-direction keystones of the plurality of LBS projection optical systems.

According to another aspect of the present invention, there is provided a 3D image display apparatus using LBS projection optical systems, including: a plurality of LBS projection optical systems arrayed in horizontal and vertical directions, and each having a beam-projection center point for outputting light to an outside of the LBS projection optical system; an input unit through which a 3D image signal is input; an image signal controller configured to distribute the 3D image signal input through the input unit to the LBS projection optical systems; a first optical system disposed a predetermined distance away from the array of the plurality of LBS projection optical systems in a depth direction (z-axis direction); a second optical system disposed a predetermined distance away from the first optical system in the depth direction (z-axis direction); and a screen disposed a predetermined distance away from the second optical system. Light output from the beam-projection center points of the respective LBS projection optical systems passes through the first optical system and the second optical system and forms images on the screen, so that an array of 3D image reference points is formed.

Here, the beam-projection center points of the respective LBS projection optical systems may be arrayed at predetermined intervals in the horizontal direction (x-axis direction).

Preferably, the first optical system may be composed of a convex lens or a Fresnel lens, the second optical system may be composed of a cylindrical convex lens or a cylindrical Fresnel lens aligned in the vertical direction (y-axis direction), the screen may have a vertical-direction (y-axis direction) diffusion characteristic, and the second optical system may determine a vertical size of a 3D image picture, so that beams projected from the beam-projection center points of the respective LBS projection optical systems form a 3D pixel line on the screen.

Preferably, a size of the 3D image picture formed on the screen may be adjusted by adjusting a ratio of a focal length of the first optical system to a horizontal-direction (x-axis direction) focal length of the second optical system.

Preferably, the beam-projection center points of the respective LBS projection optical systems may be arrayed at predetermined intervals in the horizontal direction (x-axis direction) and the vertical direction (y-axis direction).

Preferably, the first optical system and the second optical system may be composed of convex lenses or Fresnel lenses, and beams projected from the beam-projection center points of the respective LBS projection optical systems may become 3D pixel points on the screen, so that an array of the 3D pixel points on the screen implements a full-parallax image.

Preferably, a size of a 3D image picture formed on the screen may be adjusted by adjusting a ratio of a focal length of the first optical system to a focal length of the second optical system.

Preferably, each of the LBS projection optical systems may include: red (R), green (G), and blue (B) laser light sources; a first driver circuit 10 configured to adjust brightness of each of the R, G, and B laser light sources according to the input image signal; at least one first optical element configured to converge beams emitted from the respective R, G, and B laser light sources into one beam including pixel information of a color image; at least one second optical element configured to turn the beam including the pixel information of the color image through the first optical element toward a beam projection reference point; a third optical element positioned at the beam-projection reference point and configured to scan the beam including the pixel information of the color image in a raster pattern; and a fourth optical element positioned between the second optical element and the third optical element and configured to change a distribution of light intensity of the beam incident from the second optical element so that a horizontal-direction (x-axis direction) light intensity distribution of the beam output through the third optical element has a quadrangular or trapezoidal shape having a flat central portion.

Preferably, the first optical element 20 may be a dichroic mirror having wavelength-specific reflection and transmission characteristics.

Preferably, the second optical element 30 may be a reflection mirror or a prism.

Preferably, the third optical element 40 may be a micro-electro-mechanical system (MEMS) mirror having two axes in the horizontal direction (x-axis direction) and the vertical direction (y-axis direction).

Preferably, the fourth optical element 50 may be a diffractive optical element (DOE) or a holographic optical element (HOE) for beam shaping, an optical filter for attenuating the beam according to a position in a shape of the beam, or an optical filter for attenuating laser light according to a position in a area of the laser light.

Preferably, the LBS projection optical system may be disposed in front of the third optical element positioned at the beam-projection reference point in a beam path, and further include a fifth optical element configured to control the beams to converge on the third optical element so that the beams diverge from the third optical element at a predetermined angle.

Preferably, the LBS projection optical system may be disposed to perform scanning in the horizontal direction (x-axis direction), the beam output from the third optical element may determine one pixel image based on one driving pulse of the R, G, and B laser light sources, and the horizontal-parallax image may be disposed at each horizontal-direction pixel image.

Preferably, by adjusting a driving pulse width of the R, G, and B laser light sources of the beam output from the third optical element, a size of a pixel on which a horizontal viewing-zone image formed by the driving pulse at a position predetermined distance away from the screen in the depth direction (z-axis direction) is disposed may be adjusted.

Preferably, by adjusting a time interval between a first driving pulse and a consecutive second driving pulse of the R, G, and B laser light sources of the beam output from the third optical element, a distance between a first pixel on which a first horizontal viewing-zone image formed by the first driving pulse at a position predetermined distance away from the screen in the depth direction (z-axis direction) is disposed and a second pixel on which a second horizontal viewing-zone image formed by the second driving pulse at a position predetermined distance away from the screen in the depth direction (z-axis direction) is disposed may be adjusted.

Preferably, each of the LBS projection optical systems may perform scanning in the vertical direction (y-axis direction) from a first horizontal position (x-axis direction) to form a first horizontal viewing-zone image at a position predetermined distance away from the screen in the depth direction (z-axis direction), and may perform scanning in the vertical direction (y-axis direction) from a position predetermined distance away from the first horizontal position in the horizontal direction (x-axis direction) to form a second horizontal viewing-zone image at a position predetermined distance away from the screen in the depth direction (z-axis direction).

Preferably, each of the LBS projection optical systems may include two or more sets of R, G, and B laser light sources and further include two or more laser driver circuits 10 for adjusting brightness of the respective laser light sources to control a 3D parallax image of the beam incident on the third optical element.

Preferably, the respective LBS projection optical systems may be disposed to perform scanning in the horizontal direction (x-axis direction), and driving pulses generated by the respective laser driver circuits 10 of the two or more sets of R, G, and B laser light sources are sequentially driven over time, so that respective pixel images adjacent in the horizontal direction by the beam output from the third optical element are formed by different sets of R, G, and B laser light sources.

Preferably, by adjusting respective widths of driving pulses generated by the respective laser driver circuits 10 of the two or more sets of R, G, and B laser light sources, a size of a pixel on which a horizontal viewing-zone image formed by the driving pulses at a position predetermined distance away from the screen in the depth direction (z-axis direction) is disposed may be adjusted.

Preferably, the LBS projection optical system may be disposed to perform scanning in the horizontal direction (x-axis direction), one pixel image may be determined by the beam output from the third optical element by two or more driving pulses of the R, G, and B laser light sources, and the horizontal-parallax image may be disposed at each horizontal-direction pixel image.

Preferably, the fourth optical element may make a scanning laser light distribution similar to a square viewing zone by removing light outside a full width at half maximum (FWHM) diameter from a Gaussian light distribution.

Preferably, the fourth optical element may have a characteristic of transmitting the beam of an area smaller than the FWHM diameter of the projection beam and equal to or larger than a tenth of the FWHM diameter of the projection beam.

Preferably, the LBS projection optical system may form a square viewing zone having a horizontal-direction (x-axis direction) beam shape and a vertical-direction (y-axis direction) beam shape whose size correspond to each other, and a laser input signal may be applied for a time ranging from larger than 0% to 30% of a scanning time corresponding to one pixel.

BRIEF DESCRIPTION OF THE DRAWINGS

The file of this patent contains at least one drawing executed in color. Copies of this patent with color drawing(s) will be provided by the Office upon request and payment of the necessary fee.

The above and other objects, features, and advantages of the present invention will become more apparent to those of ordinary skill in the art by describing in detail exemplary embodiments thereof with reference to the accompanying drawings, in which:

FIGS. 1A and 1B are conceptual diagrams of a three-dimensional (3D) image display apparatus using existing type-1 projection optical systems;

FIGS. 7A and 7B are diagrams of an image display apparatus using general laser beam scanning (LBS) optical systems, in which (a) is a conceptual diagram illustrating a principle of forming a two-dimensional (2D) image on a screen, and (b) is a diagram illustrating a raster pattern scanning method for 2D image scanning on a screen;

FIGS. 8A and 8B are conceptual diagrams illustrating a viewing-zone forming method of a parallax-barrier 3D image display apparatus using a general flat image display panel, in which FIG. 8A is a conceptual diagram showing the basic configuration and viewing-zone forming of a multi-view or super multi-view 3D image display apparatus, and FIG. 8B is a conceptual diagram showing the basic configuration and viewing-zone forming of an integral photography (IP) 3D image display apparatus;

FIGS. 9A and 9B are conceptual diagrams illustrating a viewing-zone forming method of a 3D image display apparatus using LBS projection optical systems according to a first exemplary embodiment of the present invention, in which FIG. 9A is a conceptual diagram showing the basic configuration and viewing-zone forming of a multi-view or super multi-view 3D image display apparatus, and FIG. 9B is a conceptual diagram showing the basic configuration and viewing-zone forming of an IP 3D image display apparatus;

FIGS. 20A and 20B are diagrams showing laser input current over time.

FIG. 25 is a conceptual diagram illustrating a relationship between an entire viewing-zone range (VZ width) and a viewpoint interval (VP interval) formed at a view position based on a unit LBS projection optical system according to an exemplary embodiment of the present invention;

DETAILED DESCRIPTION OF EXEMPLARY EMBODIMENTS

Figure 1B:
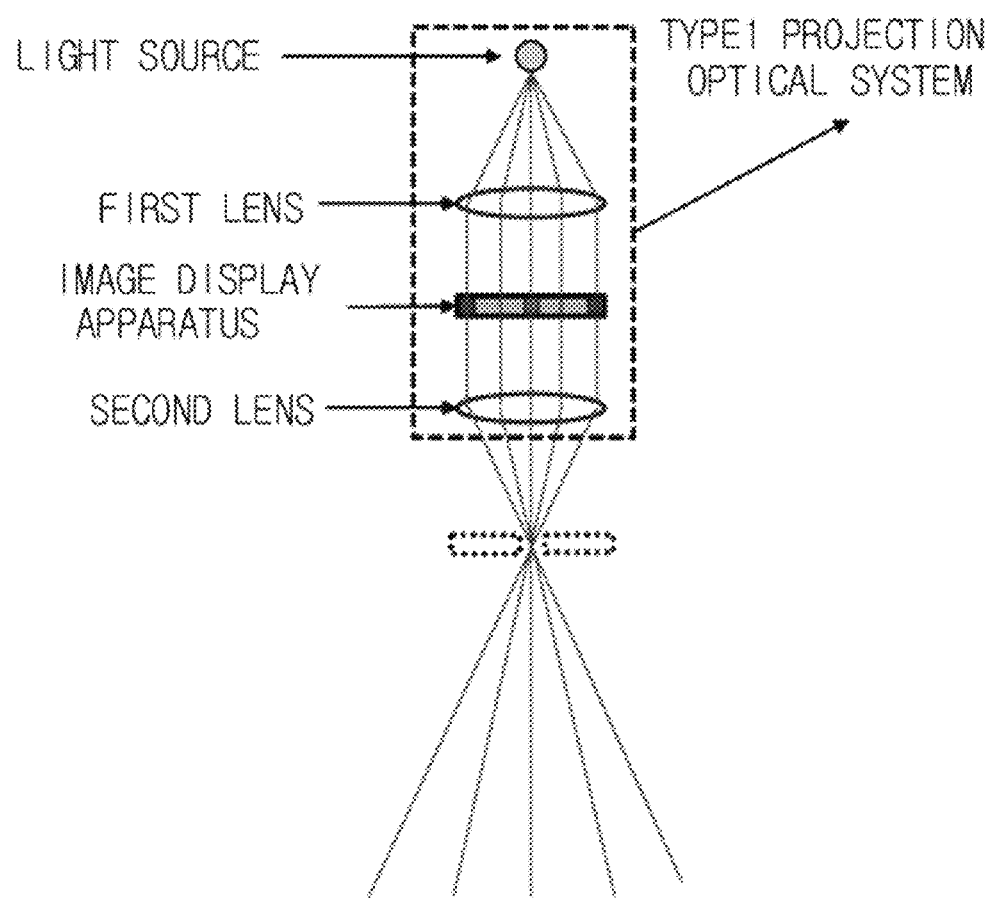

Exemplary embodiments of the present invention are disclosed herein. However, specific structural and functional details disclosed herein are merely representative for purposes of describing the exemplary embodiments of the present invention, and the present invention may be embodied in many alternate forms and should not be construed as limited to the exemplary embodiments of the present invention set forth herein. Accordingly, while the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention.

Figure 7A:
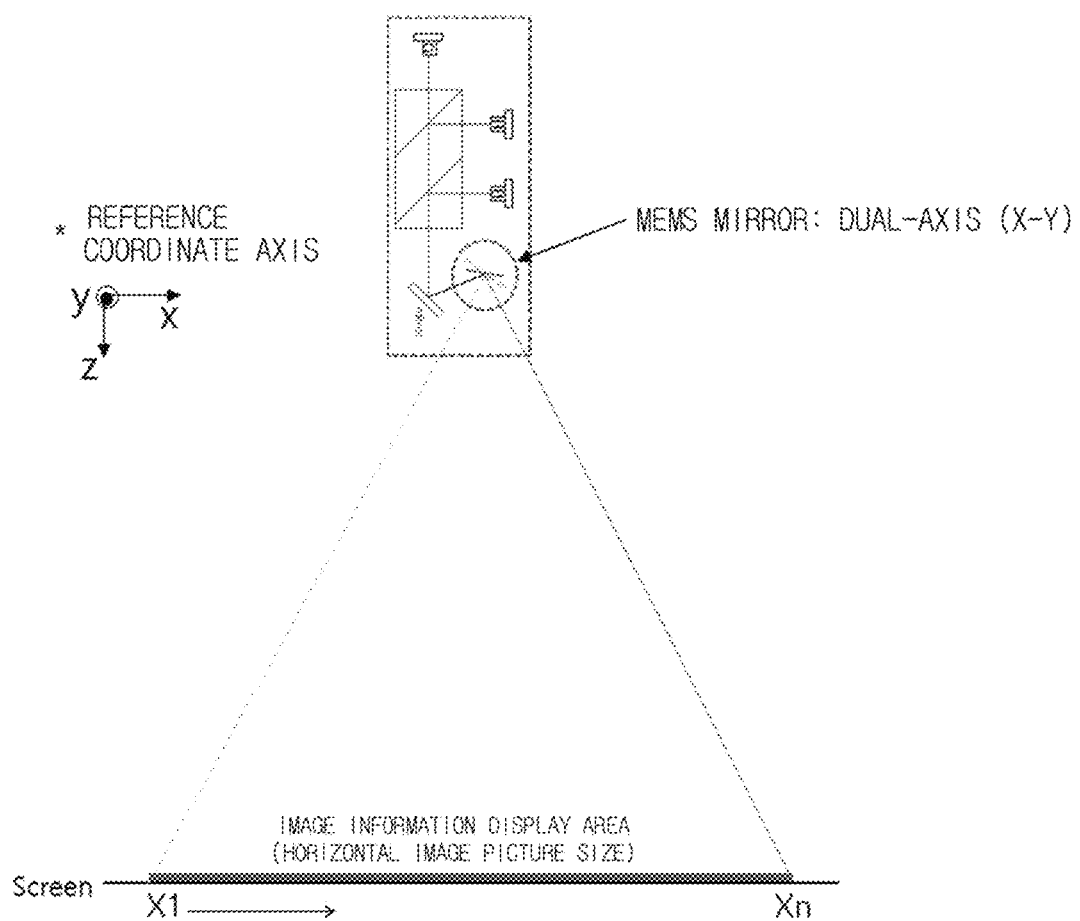

First, the basic principle of a laser beam scanning (LBS) projection optical system that is a main component of the present invention will be described with reference to FIGS. 7A, 7B and followed by descriptions of exemplary embodiments of the present invention. FIGS. 7A and 7B are diagrams of an image display apparatus using general LBS projection optical systems, in which FIG. 7A is a conceptual diagram illustrating a principle of forming a two-dimensional (2D) image on a screen, and FIG. 7B is a diagram illustrating a raster pattern scanning method for 2D image scanning on a screen.

An LBS projection optical system is a device that combines rays of light generated by red (R), green (G), and blue (B) laser light sources through a semi-transmissive optical element and then outputs the combined light through a reflection mirror (second optical element 30) and a micro-electro-mechanical system (MEMS) mirror (third optical element 40) capable of rotating about two axes.

Such a device sequentially changes brightness of the respective R, G, and B laser light sources according to input image information, and rotates the dual-axis MEMS mirror (third optical element 40) in synchronization with the input image information to send sequentially changed image information to another position in a screen.

This is referred to as a raster pattern scanning method, and an example thereof is shown in FIG. 7B. The LBS projection optical system generates an image on the screen by rotating the MEMS mirror (third optical element 40) in synchronization with the 3-color laser light sources, and thus does not require a focus adjustment means, which is an essential component of an existing general projection optical system, such as a lens system for projecting image information on the screen a predetermined distance away from an image display panel.

In an existing general projection optical system, there is a lens system for adjusting the focus of an image on a screen at a predetermined distance, and thus the volume of the projection optical system is large. Also, it is not easy to adjust the projection distance of an image formed by a lens. Further, when an array of a plurality of projection optical systems is used, the alignment, etc. of the projection optical systems is complicated, and it is not easy to correct image distortion.

On the other hand, the LBS projection optical system generates an image through image information signal processing when only the 3-color laser light sources, some kinds of dichroic mirrors (first optical elements 20), the reflection mirror (second optical element 30), and the MEMS mirror (third optical element 40) for scanning image information are included. Therefore, a system is simplified, and it is easy to configure the system with a plurality of LBS projection optical systems.

In addition, unlike a projection optical system for generating an image by a general imaging system, the LBS projection optical system sets the position of the screen on which an image is generated more freely, thus facilitating a change in image size. Also, even when the distance from each LBS projection optical system to the screen is changed in a system configuration using a plurality of LBS projection optical systems, the focus of an image is not blurred, and it is possible to freely control the array of the plurality of LBS projection optical systems.

Figure 3A:
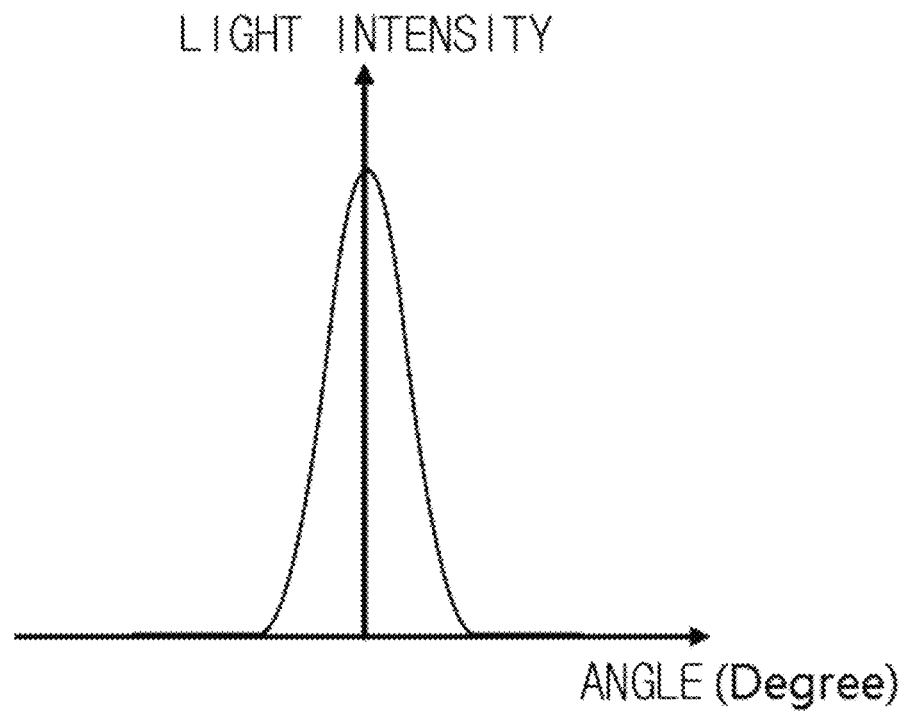
FIGS. 3A, 3B and 3C are diagrams showing the distribution of light intensity according to an angle in a viewing zone formed at the position of each cross section shown in FIG. 1A, in which (a), (b), and (c) show the distribution of light intensity in A-A' cross section, B-B' cross section, and C-C' cross section, respectively.
Figure 3B:
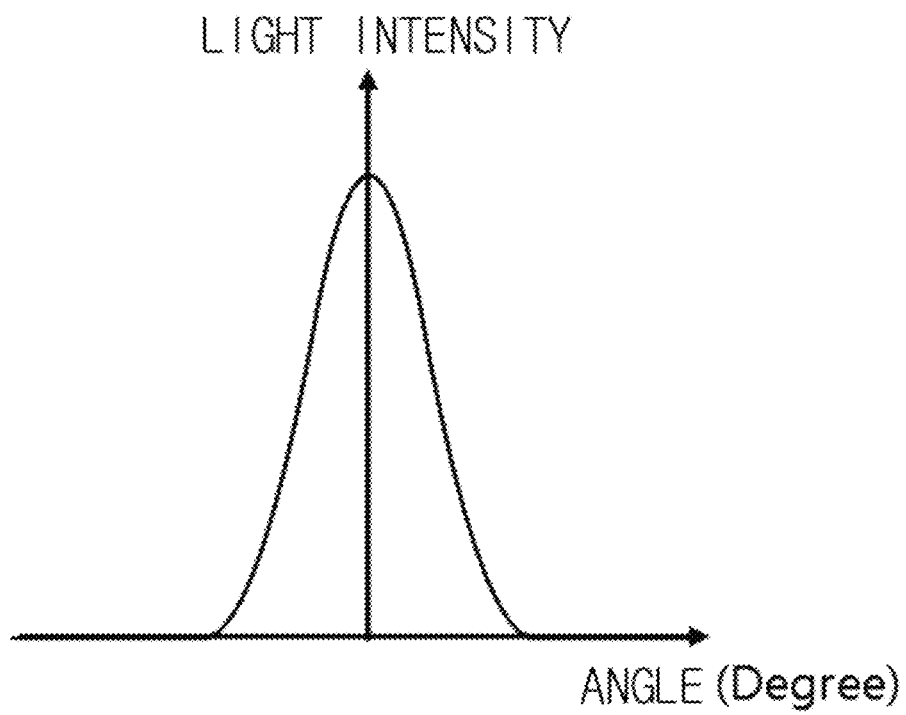
Figure 3C:
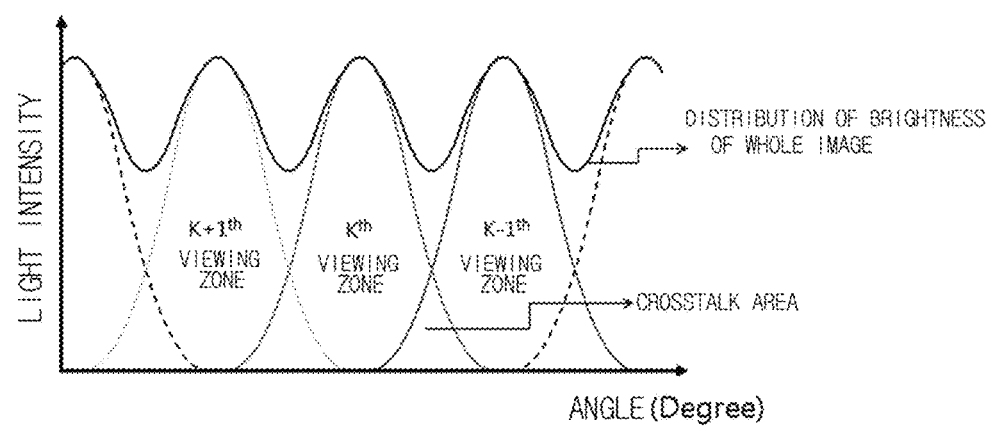
Figure 4A:
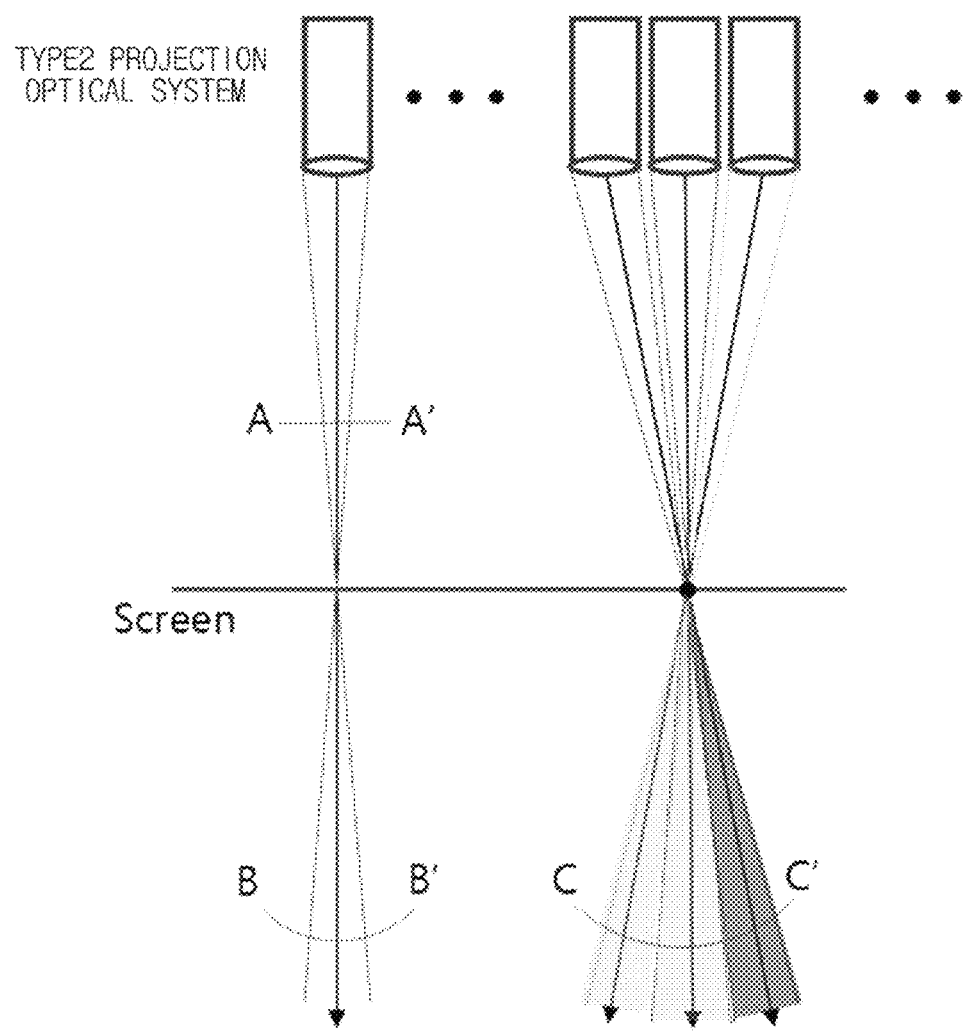
FIGS. 4A and 4B are conceptual diagrams of a 3D image display apparatus using existing type-2 projection optical systems.
Figure 4B:
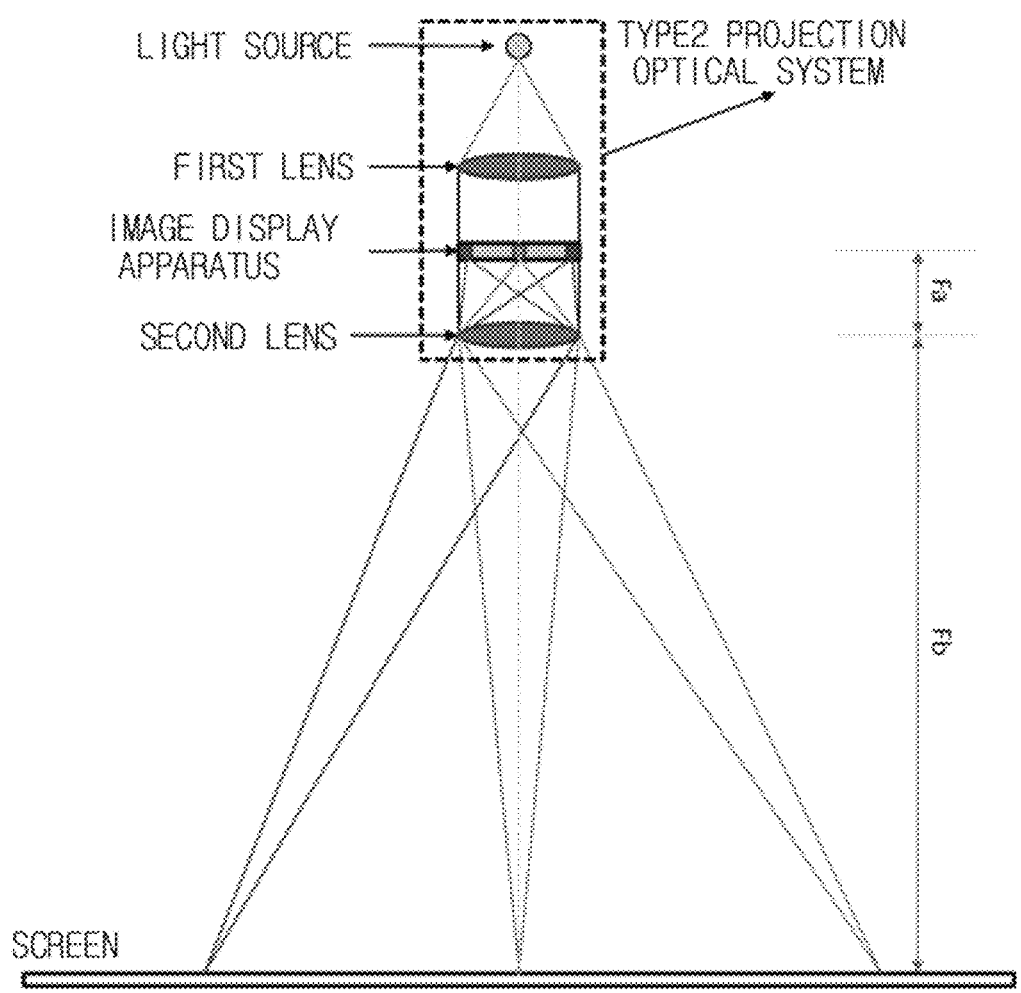
Figure 5:
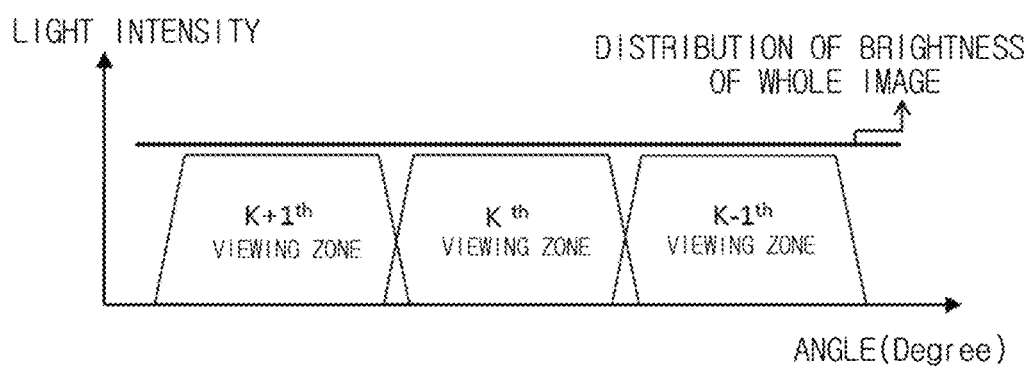
FIG. 5 is a diagram illustrating the ideal distribution of viewing zones in unit 3D pixels of a 3D image display apparatus using projection optical systems.
Figure 6:
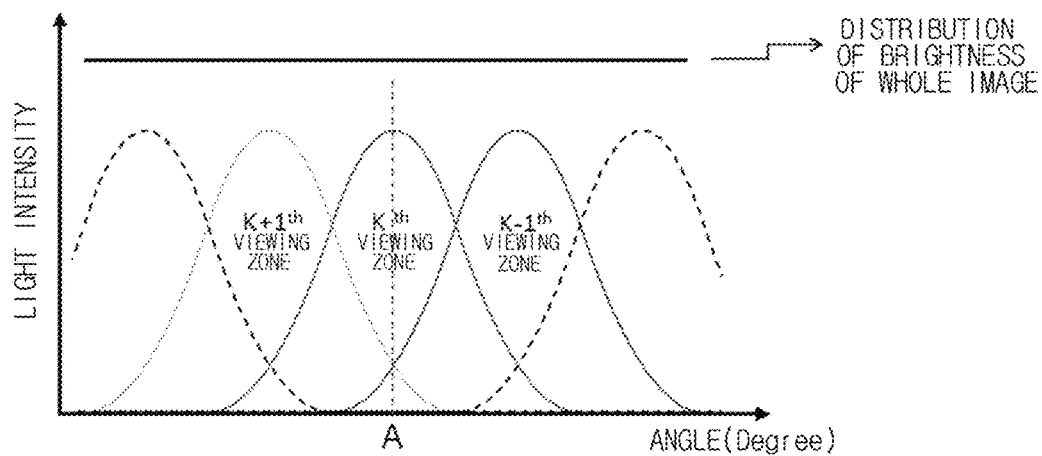
FIG. 6 shows an example of a viewing zone actually implemented in unit 3D pixels of a 3D image display apparatus using type-2 projection optical systems.

However, light output from a general LBS projection optical system to display image information has a Gaussian distribution of light intensity as shown in FIG. 3B. Therefore, it is necessary to prevent the degradation of 3D image quality caused when general LBS projection optical systems are applied to a 3D image display apparatus according to exemplary embodiments of the present invention, and there are necessities for the concept of an image signal processing method for efficiently configuring a 3D image display apparatus according to exemplary embodiments of the present invention and a modified LBS projection optical system to which the image signal processing method is applied.

Figure 8A:
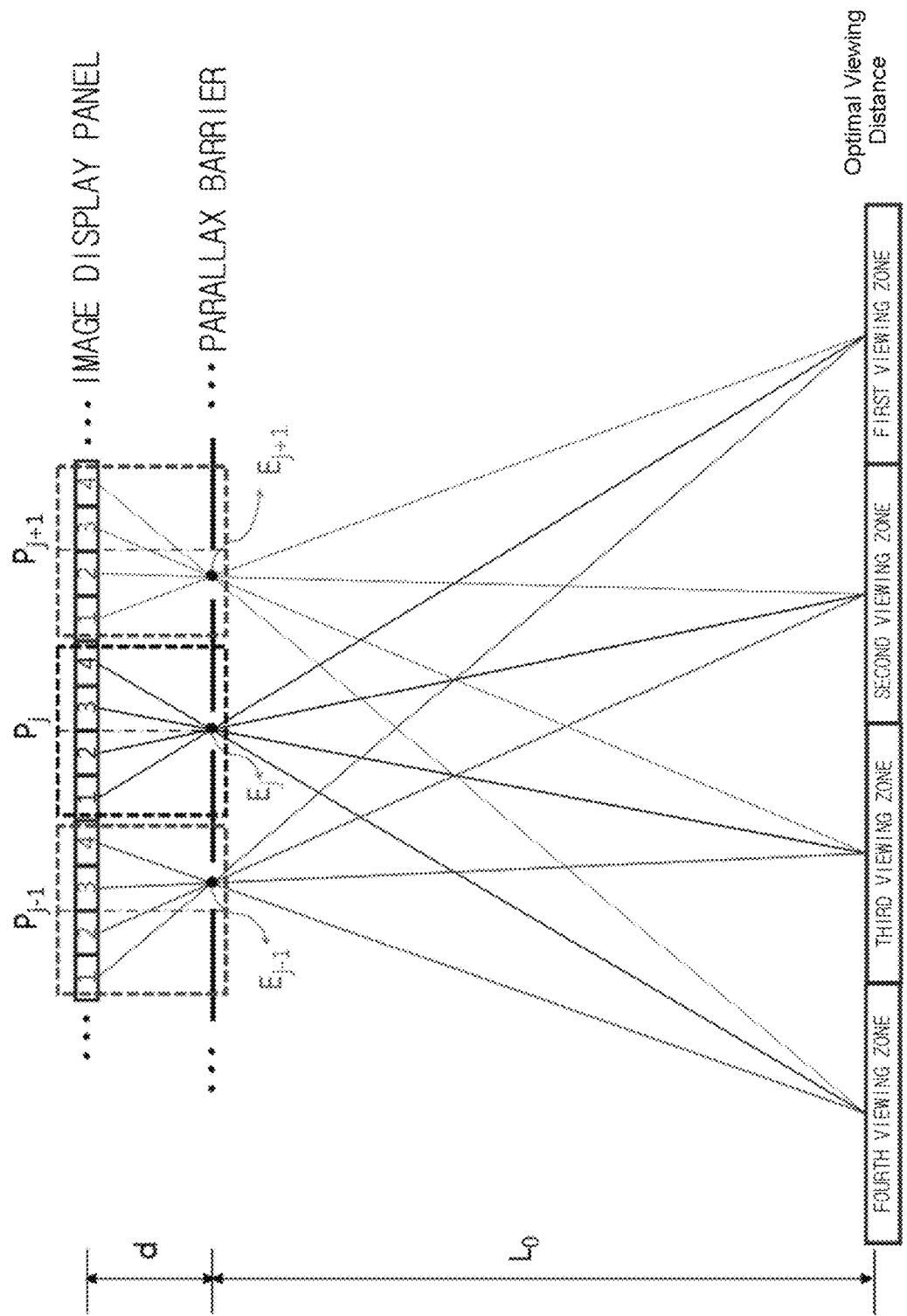
Figure 8B:
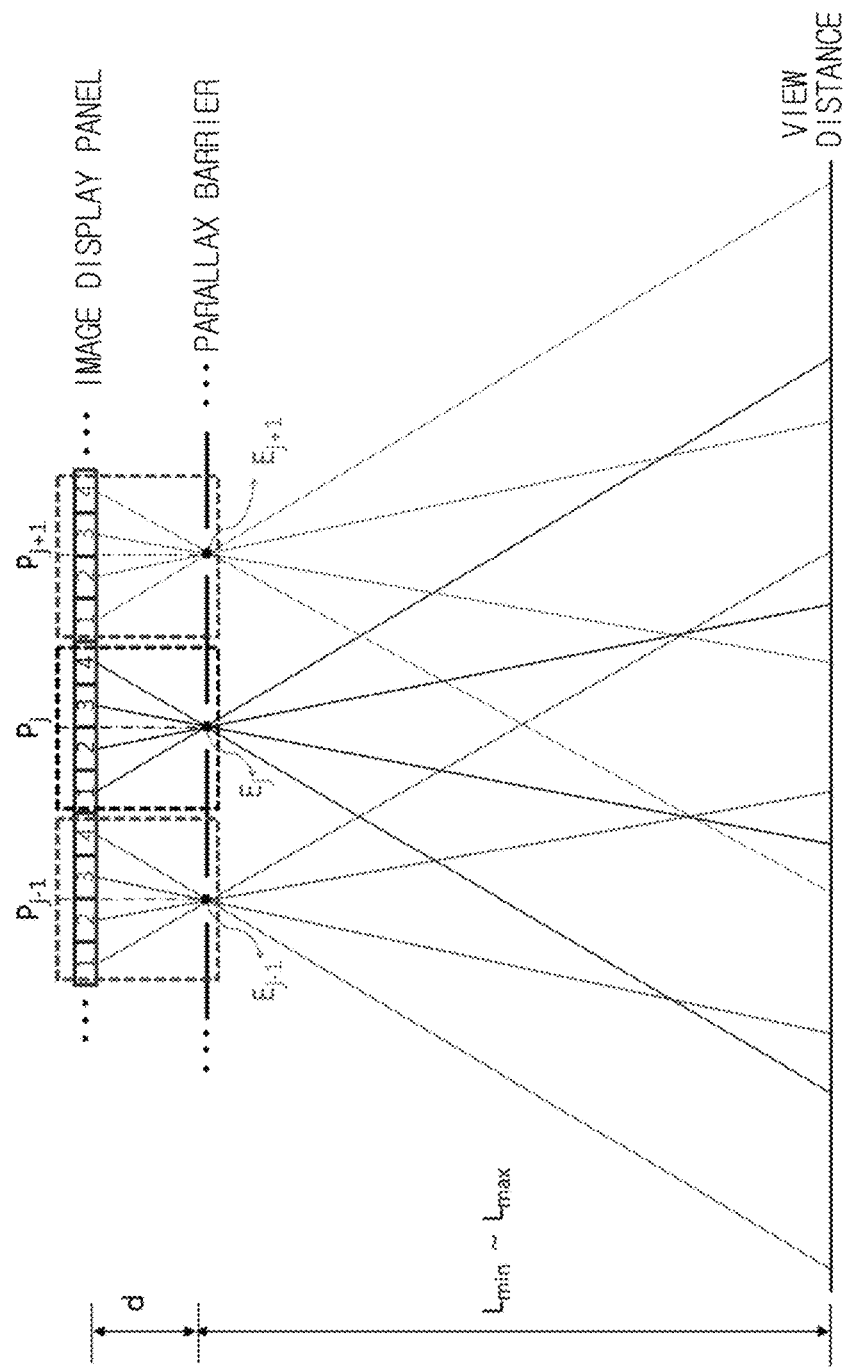
Figure 9A:
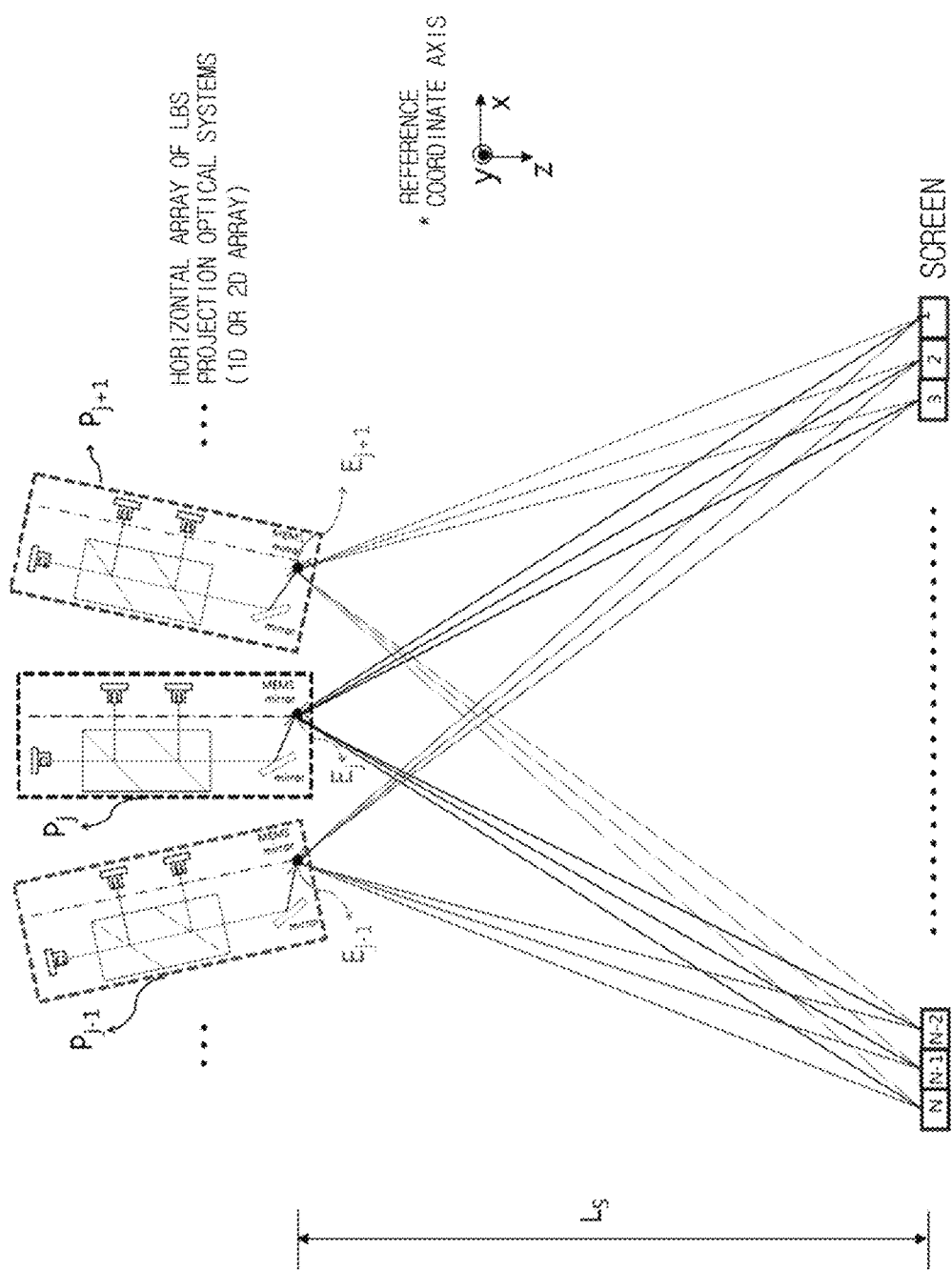
Figure 9B:
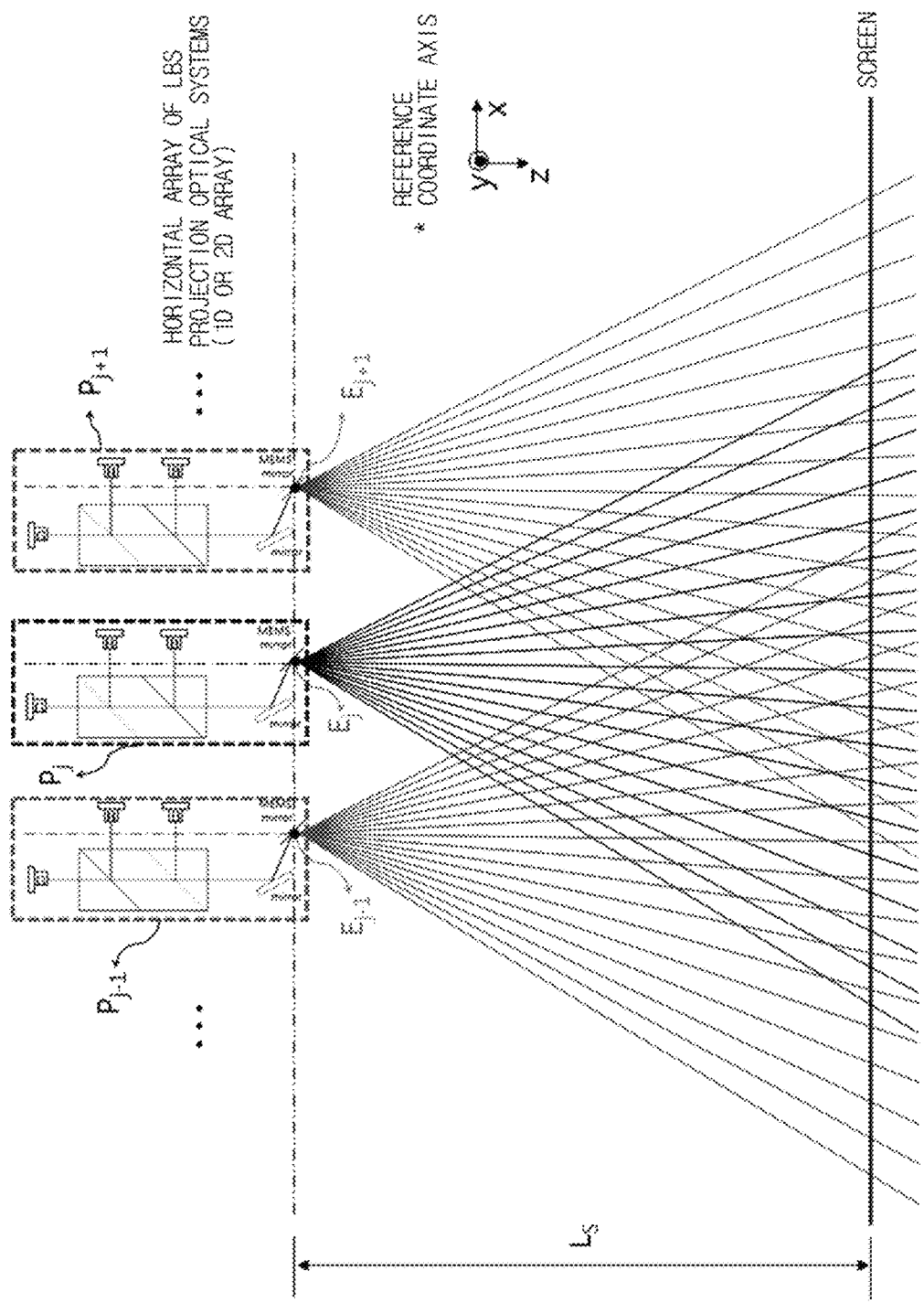

A first exemplary embodiment of the present invention using those advantages of an LBS projection optical system and to which LBS projection optical systems obtained by modifying existing LBS projection optical systems appropriately for exemplary embodiments of the present invention are applied is shown in FIGS. 9A and 9B. FIGS. 8A and 8B illustrate a basic configuration and a viewing-zone forming principle of an auto-stereoscopic 3D image display apparatus using a general flat panel display (FPD) in comparison with the first exemplary embodiment of the present invention shown in FIGS. 9A and 9B to which modified LBS projection optical systems are applied.

A method of generating a spatial-division-based multi-view or integral image using a general flat image display panel includes disposing a parallax barrier or a lenticular lens that is a parallax separation means in front of the flat image display panel at a predetermined distance, and disposing viewpoint images on the image display panel, so that a viewer a predetermined distance away from the parallax separation means recognizes a 3D image from parallax images provided to the viewer's both eyes.

FIGS. 8A and 8B show examples of viewing zones of multi-view and integral images formed using a flat image display panel and a parallax barrier according to a 4-viewpoint design. The largest hardware (H/W) difference between a multi-view design (FIG. 8A) and an integral photography (IP) design (FIG. 8B) is whether a design has a structure for determining an optimal view distance and forming a common viewing zone at the optimal view distance or a structure for symmetrically diverging the optical paths of viewpoint images diverging through a parallax barrier, through all openings of the parallax barrier. This may be determined according to whether the interval between parallax barrier openings in front of the image display panel is equal to or smaller than a predetermined horizontal width (the number of viewpoints×a pixel width). Recently, a modified IP design between a multi-view design and an IP design is also being introduced into a 3D image display apparatus.

The multi-view or IP 3D system of FIGS. 8A and 8B using a flat image display panel may be regarded as one unit together with a set of pixels on which viewpoint images are disposed and parallax barrier openings. This unit may be set as a minimum unit for generating a designed 3D viewpoint image and referred to as a 3D pixel. Also, such a 3D pixel may extend normally or diagonally to the image display panel, and this is defined as a 3D pixel line. For example, FIGS. 8A and 8B show 3D pixels $P_{j-1}$, $P_j$, and $P_{j+1}$ each constituted by an image display panel and one parallax barrier opening on the x-z plane. The center of each 3D pixel that is an optical reference becomes a horizontal center position $E_{j-1}$, $E_j$, or $E_{j+1}$ of a parallax barrier opening.

The concept of a 3D image display apparatus using LBS projection optical systems according to the first exemplary embodiment of the present invention and employing 3D pixels that are minimum basic units for implementing multi-view or integral images using a flat image display panel is shown in FIGS. 9A and 9B.

In the first exemplary embodiment of the present invention, one LBS projection optical system becomes a 3D pixel or pixel line. In other words, when a 3D system for providing only horizontal parallax is designed, one LBS projection optical system serves as a 3D pixel line for providing a horizontal parallax image. When a 3D system for providing full-parallax 3D images is designed, one LBS projection optical system serves as a 3D pixel for forming a 3D viewing zone on a 2D space.

FIG. 9A shows a multi-view 3D system similar to that of FIG. 8A, and FIG. 9B shows an IP 3D system similar to that of FIG. 8B. In FIGS. 9A and 9B, the center of an opening of the parallax barrier of FIGS. 8A and 8B become the center of a dual-axis (x and y axes) MEMS mirror (third optical element 40). Although not shown in the drawing, the present invention may be applied to a modified IP system in which advantages of the multi-view system of FIG. 9A and the IP system of FIG. 9B are combined.

Figure 10:
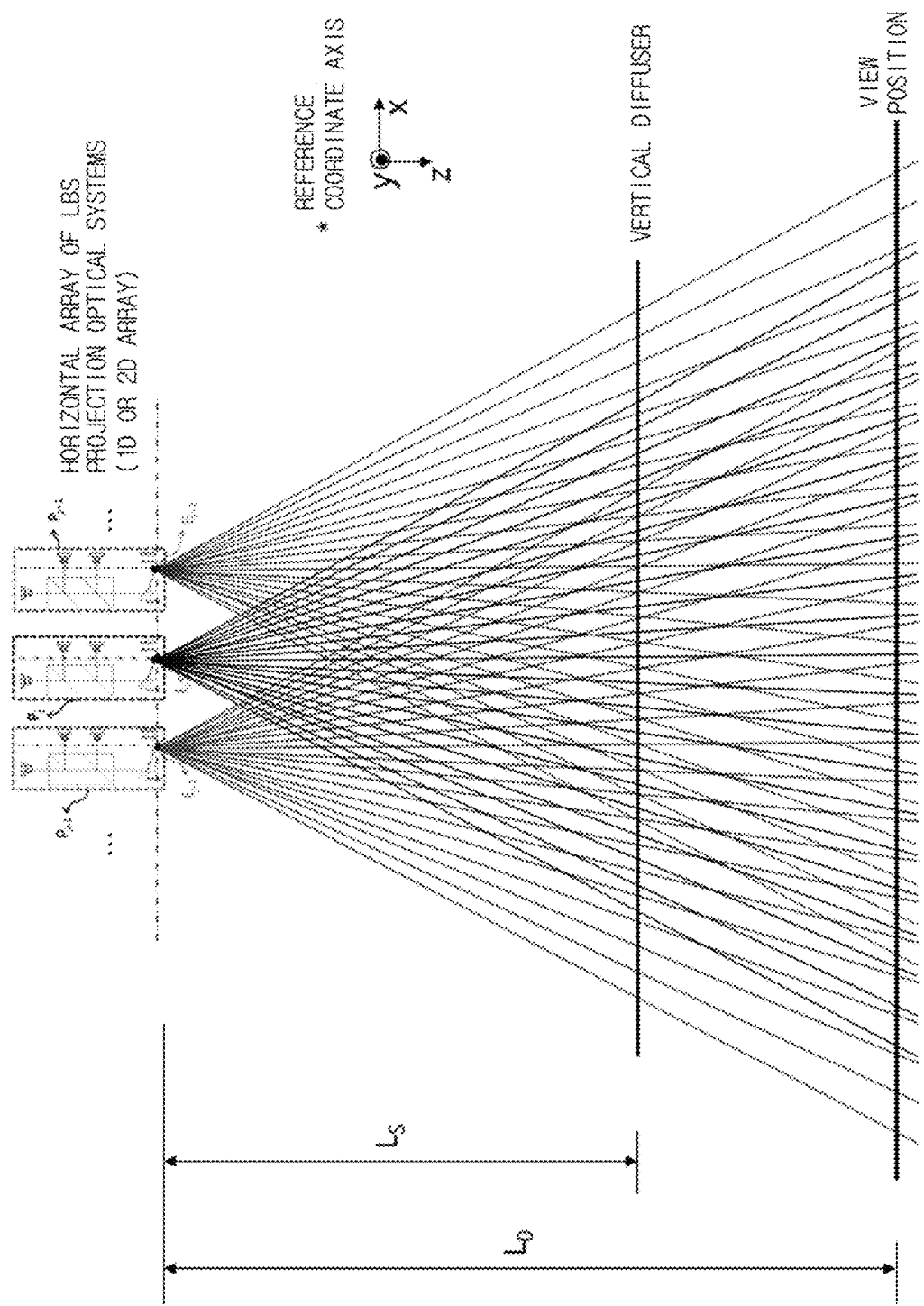
FIG. 10 is a conceptual diagram illustrating viewing-zone forming and 3D image view positions of a 3D image display apparatus using LBS projection optical systems and providing only horizontal parallax according to the first exemplary embodiment of the present invention.

The above description relates to the concept of a 3D pixel or pixel line of a flat image display panel, and its similarity with a 3D pixel or pixel line of an LBS projection optical system according to an exemplary embodiment of the present invention. However, there is a difference between a viewing-zone forming method of a system for implementing 3D images using 3D pixels or pixel lines consisting of unit LBS projection optical systems and a method of using 3D pixels or pixel lines employing a flat image display panel. Such a difference will be described with reference to FIG. 10.

In an existing multi-view or IP system using an FPD and a parallax barrier, a 3D pixel or pixel line $P_{j-1}$, $P_j$, or $P_{j+1}$ for displaying a 3D image has an expanded area in the x-y plane.

However, in a multi-view or IP system using LBS projection optical systems according to an exemplary embodiment of the present invention, a diffuser is ideally installed at a predetermined distance Ls away from MEMS mirrors (third optical element 40) having a size of about 1 mm in an LBS projection optical system array, so that a 3D pixel forms an expanded area on the x-y plane. Then, it is possible to view a multi-view or integral image at a position predetermined distance ($L_0$–$L_S$) away from the diffuser.

This is a different configuration than that of FIGS. 1A and 1B or FIGS. 4A and 4B which are 3D image display apparatuses using an existing lens-type projection optical system. According to the related art, 3D pixels or pixel lines are formed on a screen, and the position of the screen has a meaning similar to a reference position $E_{j-1}$, $E_j$, or $E_{j+1}$ of a 3D pixel or pixel line according to an exemplary embodiment of the present invention. Ultimately, each adjacent projection optical system provides a viewpoint image to the corresponding 3D pixel or pixel line. On the other hand, according to an exemplary embodiment of the present invention, each LBS projection optical system $P_j$ becomes one 3D pixel or pixel line, and the position of an MEMS mirror (third optical element 40) in the LBS projection optical system becomes the reference position of the 3D pixel.

A case of applying the concept of each LBS projection optical system becoming a 3D pixel or pixel line according to an exemplary embodiment of the present invention to a 3D image display apparatus for displaying only horizontal parallax (FIGS. 11 and 12), and a case of applying the concept to a 3D image display apparatus for displaying full parallax (FIGS. 13 and 14) will be separately described below.

Figure 11:
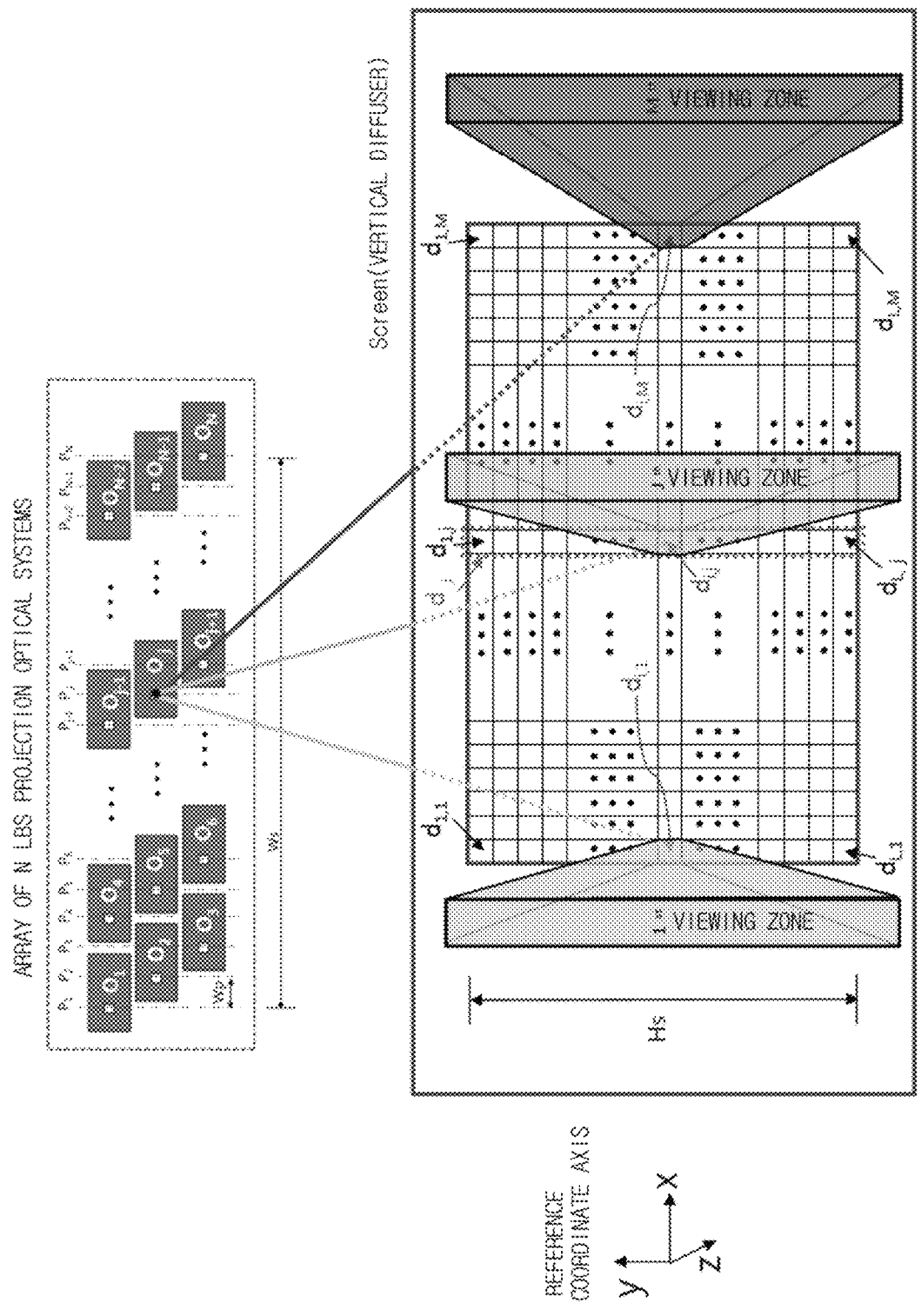
FIG. 11 is a conceptual diagram illustrating in perspective a principle of forming viewing zones on a screen by a 3D image display apparatus using an LBS projection optical system array to provide only horizontal parallax.

As shown in FIG. 11, in a 3D image display apparatus using an LBS projection optical system array and providing only horizontal parallax, a total of N LBS projection optical systems $O_1, O_2, \ldots, O_{N-1}$, and $O_N$ are arranged in a 2D array on the x-y plane, and MEMS minor (third optical element 40) center axis positions $P_1, P_2, \ldots, P_{N-1}$, and $P_N$ that are the reference positions of the respective LBS projection optical systems are disposed at predetermined intervals $W_p$ in the horizontal direction.

In such a disposition, the LBS projection optical systems may be arranged in a one-dimensional (1D) array in the x direction only when the horizontal size of the LBS projection optical systems is smaller than $W_p$, whereas the LBS projection optical systems are required to be arranged in a 2D array on the x-y plane when the horizontal size is equal to or larger than $W_p$. Here, a distance $W_s$ between the horizontal position of an $N^{th}$ LBS projection optical system and the horizontal position of a first LBS projection optical system becomes the horizontal size of a picture for displaying a 3D image, and the number N of arranged LSB projection optical systems becomes the horizontal resolution of a displayed 3D image. Also, a vertical diffuser positioned at a predetermined distance from the LBS projection optical system array extends the width of a vertical-direction viewing zone of image information generated from an MEMS minor (third optical element 40) center axis position $P_j$ of each projection optical system, thereby enabling a viewer a predetermined distance away from the vertical diffuser to view 3D image information according to viewing zones arranged in the vertical direction.

FIG. 11 may show M horizontal viewing zones $d_1$, $d_2$, $d_{M-1}$, and $d_M$ generated from one LBS projection optical system $O_j$ among formed LBS projection optical systems of a M (horizontal)×L (vertical) resolution and formed on the vertical diffuser, and L pieces of vertical-direction image information per horizontal viewing zone. Each horizontal viewing zone for displaying L pieces of vertical-direction image information on such a vertical diffuser is formed from a 3D pixel line having a center at an optical reference position $P_j$ of each projection optical system $O_j$.

FIG. 11 representatively shows the shapes of a first viewing zone, a $j^{th}$ viewing zone, and an $M^{th}$ viewing zone of an $i^{th}$ piece of image information among L pieces of vertical-direction image information behind the vertical diffuser. Image-forming positions, that is, viewing-zone forming positions, determined on the vertical diffuser by non-shown another LBS projection optical system may vary according to the array of LBS projection optical systems. Therefore, a vertical-direction image size Hs for displaying a 3D viewpoint image from each LBS projection optical system is in proportion to the distance from the LBS projection optical system array to the vertical diffuser, and the vertical-direction resolution of an image in the same viewing zone becomes L, which is the same as the vertical-direction resolution of the LBS projection optical system.

Figure 12:
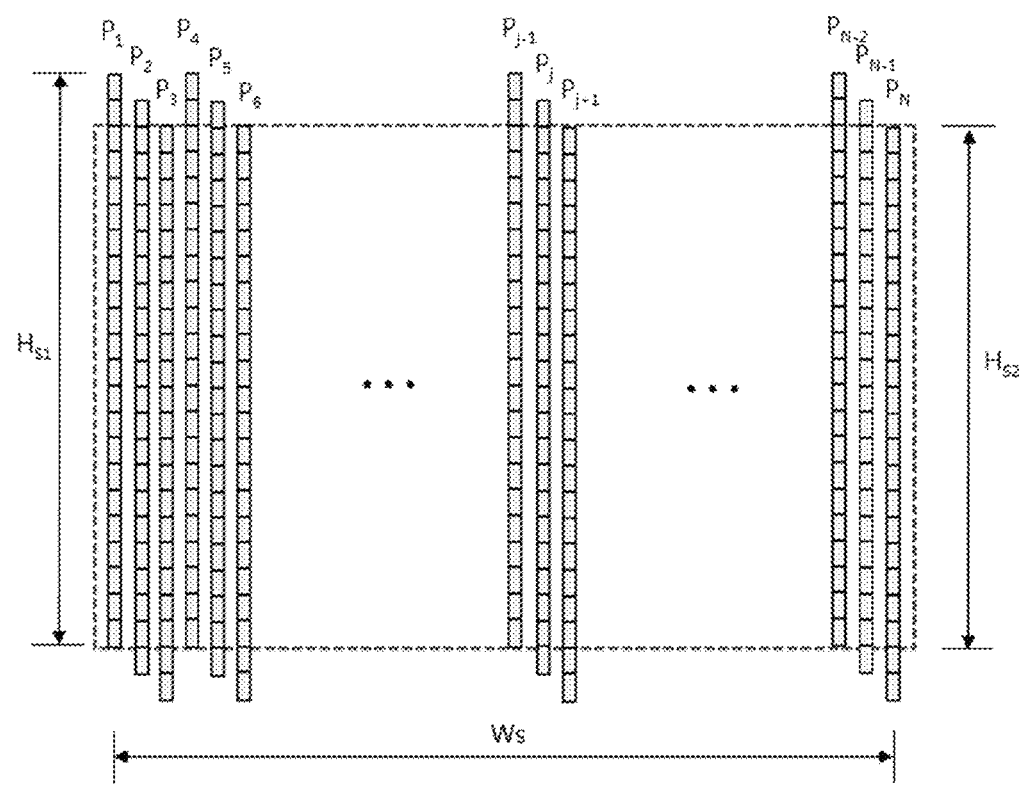
FIG. 12 is a diagram showing the size of a 3D image information display picture shown at the position of a viewer behind a screen that is a vertical diffuser and an example of the disposition of viewpoint images of 3D image information display pixel row according to LBS projection optical systems.

FIG. 12 shows the size of a picture for displaying a 3D image seen by each pupil of a viewer who views 3D images behind the vertical diffuser from viewing zones separately formed by respective LBS projection optical systems, and an example of the disposition of viewpoint images generated by 3D pixel lines of the respective LBS projection optical systems.

Lines vertically arranged in the drawing denote vertical image information of the corresponding viewing zones generated from the reference positions $P_1, P_2, \ldots, P_{N-1}$, and $P_N$ of the respective LBS projection optical systems and viewed at viewer positions of respective 3D pixel lines. These are referred to as viewing-zone image strips. The viewing-zone image strips projected on the vertical diffuser from the LBS projection optical systems are disposed in the horizontal direction apart from one another by intervals between the reference positions $P_1, P_2, \ldots, P_{N-1}$, and $P_N$ of the LBS projection optical systems. When viewing-zone information is viewed at a viewer position from all the LBS projection optical systems, the horizontal size of a picture for displaying image information viewed by the viewer becomes the same as a width Ws of the LBS projection optical system array.

The maximum vertical-direction size of an image is the same as a vertical size $H_{s1}$ of viewing-zone image strips formed on the vertical diffuser by a single LBS projection optical system. However, when a y-axis position in the 2D LBS projection optical system array differs from the vertical position of viewing-zone image strips formed by another projection optical system on the vertical diffuser, a height $H_{s2}$ in which viewing-zone image strips overlap one another becomes the vertical size of an image.

At this time, an area having no image information in principle is generated between adjacent viewing-zone image strips (because a diffuser is not used for the horizontal direction but only the vertical-direction diffuser is used). To remove such an area having no image information in the horizontal direction, a horizontal-direction diffuser may be used. The position of the horizontal-direction diffuser may be the same as that of the vertical diffuser (in this case, the diffusers ultimately become an anisotropic diffuser), or may be between the LBS projection optical system array and the vertical diffuser, that is, different from that of the vertical diffuser.

Figure 13:
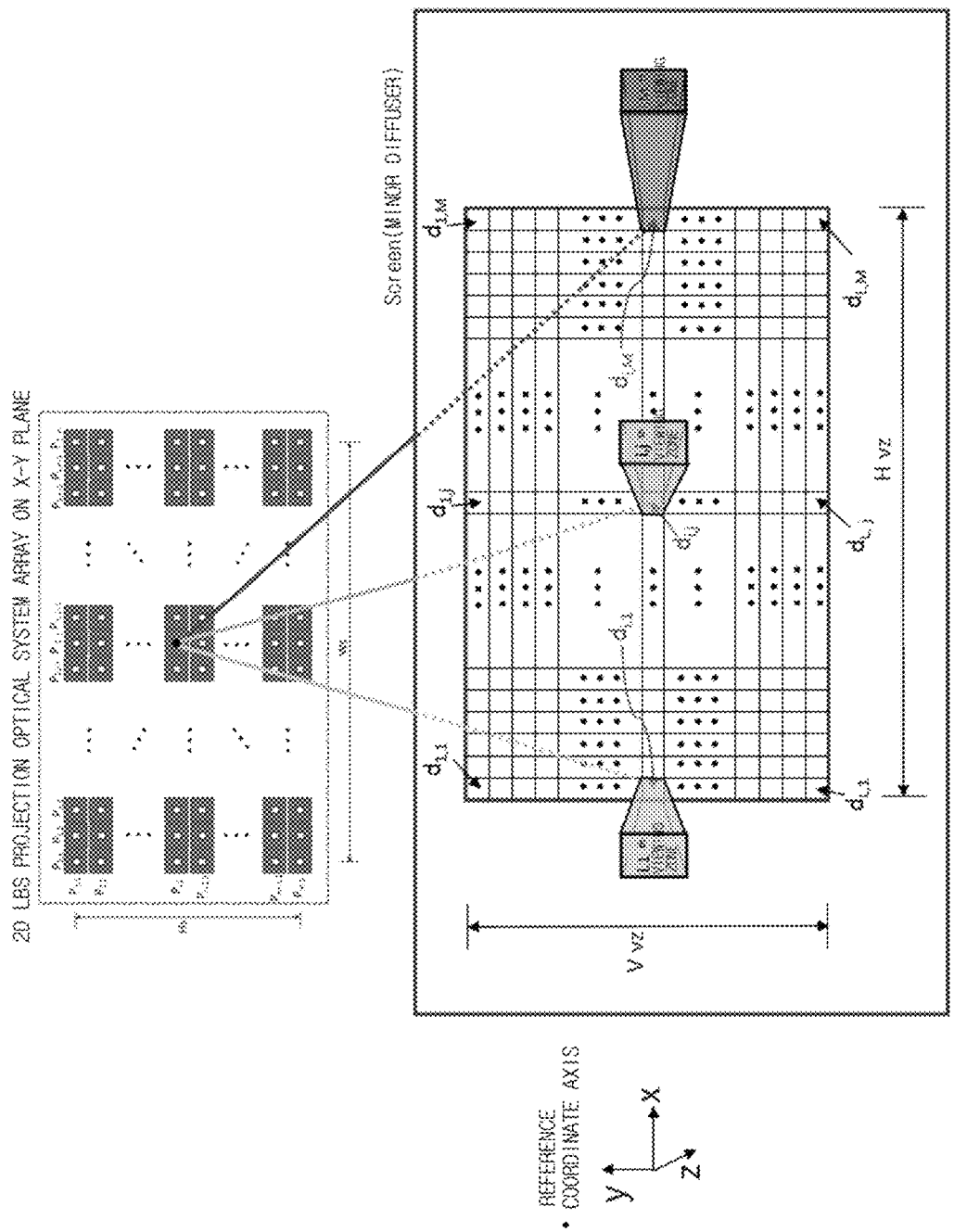
FIG. 13 is a conceptual diagram illustrating in perspective a principle of forming viewing zones on a screen by a full-parallax 3D image display apparatus using a 2D LBS projection optical system array.
Figure 14:
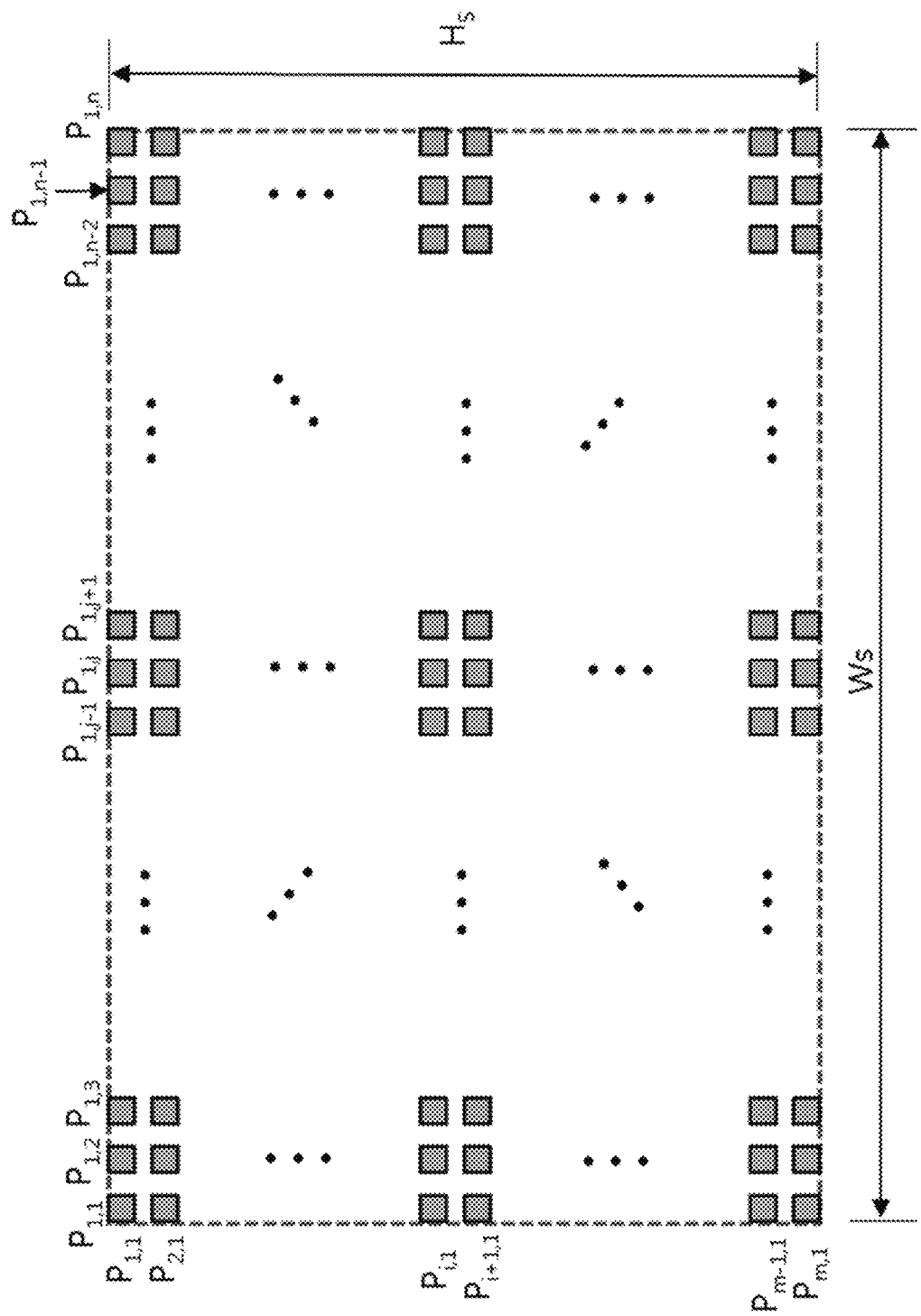
FIG. 14 is a diagram showing the size of a 3D image information display picture shown at a viewer position behind a screen that is a minor diffuser by the full-parallax 3D image display apparatus of FIG. 13 and an example of the disposition of viewpoint images of 3D image information display pixel according to LBS projection optical systems.

As another exemplary embodiment of the present invention, an image display apparatus for implementing a full-parallax image will be described with reference to FIGS. 13 and 14. FIG. 13 is a conceptual diagram illustrating in perspective a principle of forming viewing zones on a screen by a full-parallax 3D image display apparatus using a 2D LBS projection optical system array, and FIG. 14 is a diagram showing the size of a 3D image information display picture shown at a viewer position behind a screen that is a minor diffuser by the full-parallax 3D image display apparatus of FIG. 13 and an example of the disposition of images of 3D image information display pixel viewpoints according to LBS projection optical systems.

The array of LBS projection optical systems consists of n LBS projection optical systems in the horizontal direction (x-axis direction) and m LBS projection optical systems in the vertical direction (y-axis direction). In this array, reference positions $P_{i,j}$ of the respective LBS projection optical systems are at regular intervals in the x-axis direction and the y-axis direction. The interval between a first column and an $n^{th}$ column in the x-axis direction becomes the horizontal size of a 3D image picture, and the interval between a first row and an $m^{th}$ row in the y-axis direction becomes the vertical size of the 3D image picture.

Here, the reference positions $P_{i,j}$ of the respective LBS projection optical systems become 3D pixels, and full-parallax viewing zones generated according to the respective 3D pixels are formed at positions on a screen a predetermined distance away from the 2D LBS projection optical system array. The maximum number of viewing zones formed in this way becomes the same as the resolution of each LBS projection optical system. In other words, when horizontal-direction and vertical-direction resolutions are L and M, respectively, the number of horizontal viewing zones (x-axis directional viewing zones) and the number of vertical viewing zones (y-axis directional viewing zones) become L and M, respectively.

Unlike the image display apparatus forming only horizontal parallax and shown in FIGS. 11 and 12, the screen that is the minor diffuser is disposed to have as a minor diffusion effect in the x-axis and y-axis directions as pieces of image information between the 3D pixels arranged in a 2D array on the x-y plane are not shown discontinuous, and the size of a picture for displaying a 3D image is determined by the LBS projection optical systems in the 2D array. In connection with this full-parallax 3D image display apparatus, FIG. 14 shows the size of a picture for forming a 3D viewing zone viewed at a viewer position behind the minor diffuser, and the disposition of viewing zones generated at respective picture positions from the respective LBS projection optical systems.

Figure 2:
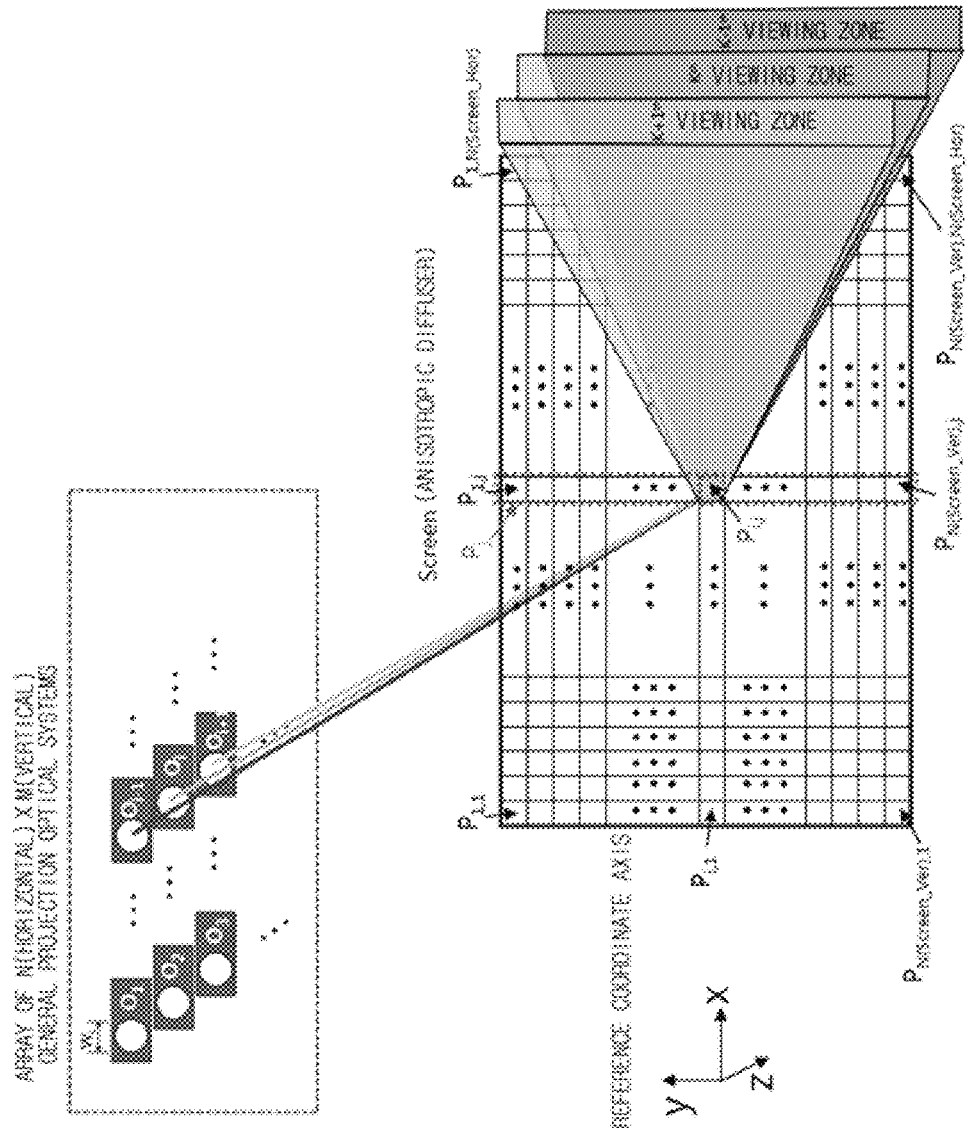
FIG. 2 is a conceptual diagram illustrating in perspective a viewing-zone forming principle of a 3D image display apparatus using general projection optical systems.

In the structure of the 3D image display apparatus of FIGS. 11 and 12 forming only horizontal parallax according to an exemplary embodiment of the present invention, a vertical diffusion depth differs from the depth positions of the LBS projection optical systems that are start points for forming horizontal viewing zones. In a general 3D image display apparatus using a parallax-barrier (see FIGS. 8A and 8B) and a general 3D image display apparatus using projection optical systems (see FIG. 2), the two kinds of depths are identical in general.

Figure 15:
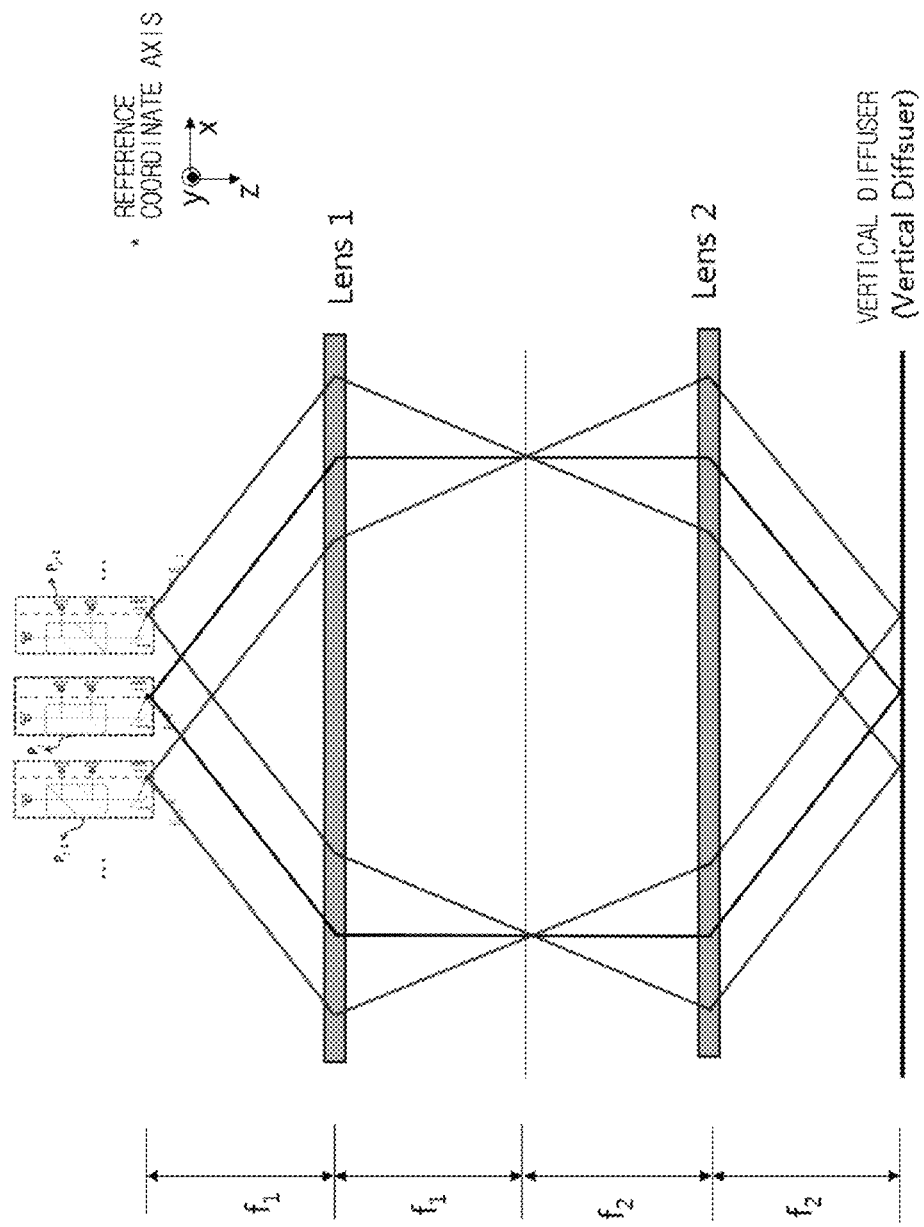
FIG. 15 is a diagram illustrating a method of generating an array of 3D pixel lines having a 3D image picture size on a vertical diffuser using an array of LBS projection optical systems and a 4f system according to another exemplary embodiment of the present invention.

In another exemplary embodiment of the present invention, the position of a vertical diffusion depth and the position of horizontal viewing zones in the depth direction (z-axis direction) may be made to coincide with each other at one z position (vertical-diffuser position) using a 1D or 2D LBS projection optical system array on the x-y plane and a 4f system structure as shown in FIG. 15.

In this case, lens 1 may be a general convex lens, a Fresnel lens, a spherical mirror, or so on. Lens 2 may be a cylindrical convex lens, a cylindrical surface mirror, a horizontal Fresnel lens, etc. to set reference positions of 3D pixel lines in the horizontal direction (x-axis direction) on the vertical diffuser while maintaining the size of a 3D image picture in the vertical direction (y-axis direction). In this case, parallel rays of light are generated in the vertical direction (y-axis direction). Then, horizontal viewing zones are generated from 3D pixel lines that are formed on the vertical diffuser using the 4f system by respective LBS projection optical systems and whose vertical sizes extend to an image screen size, thus providing an effect similar to general parallax-barrier multi-view imaging or 1D IP.

In a general 4f system applied in the horizontal direction (x-axis direction), lens 1 and lens 2 have the same focal length (f1=f2). In the horizontal-direction (x-axis direction) 4f system according to an exemplary embodiment of the present invention, lens 1 and lens 2 may have the same focal length like the general 4f system. Also, to adjust the picture size of a necessary horizontal image, a horizontal picture size at the vertical diffuser position may be adjusted by increasing or reducing the horizontal-direction focal length f2 of lens 2 to be larger or smaller than the focal length f1 of lens 1.

Figure 16:
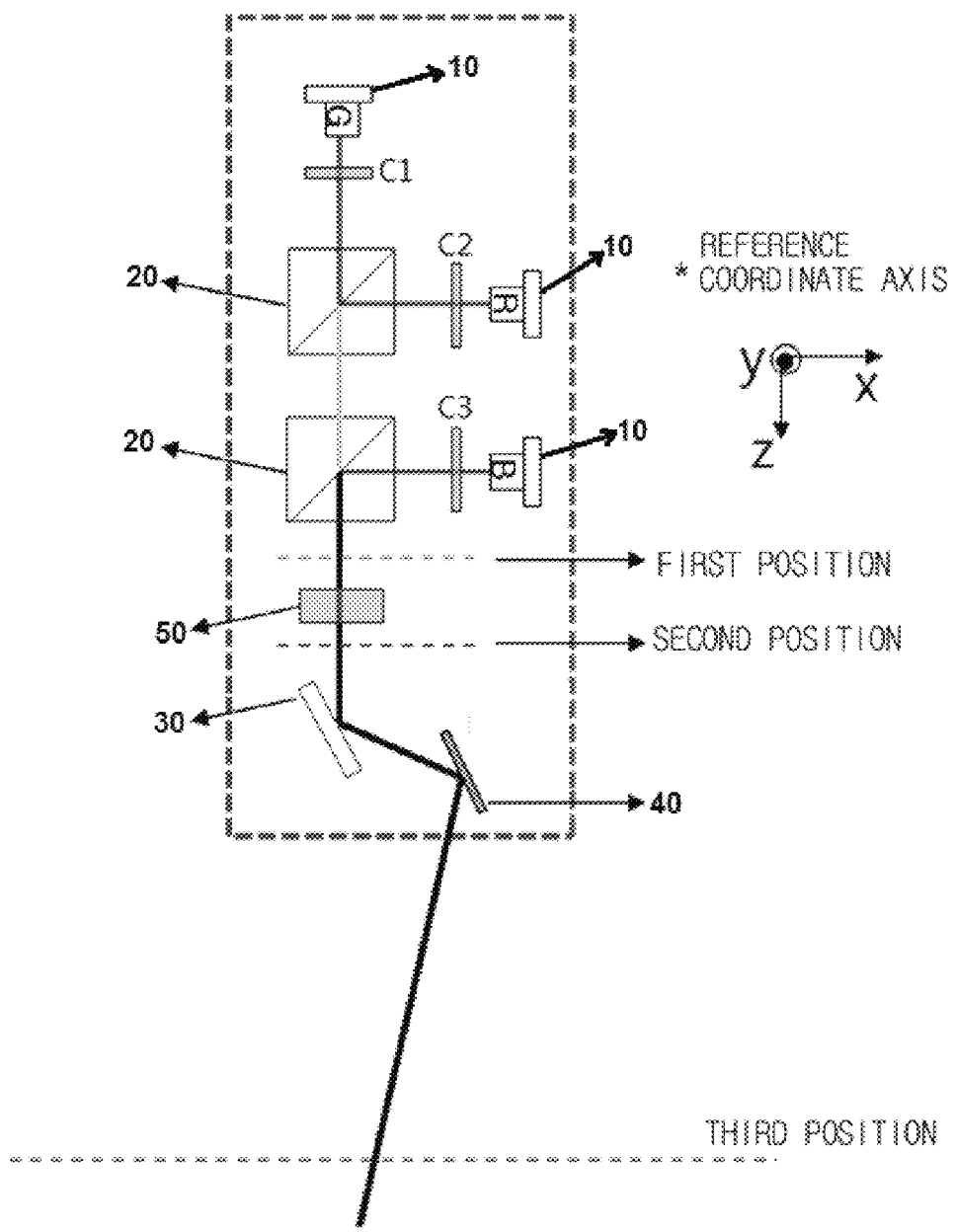
FIG. 16 is a conceptual diagram of a unit LBS projection optical system additionally including a beam shaping element according to another exemplary embodiment of the present invention.

The structure of a unit LBS projection optical system appropriate for characteristics of the present invention and a method of controlling characteristics of light output from the unit LBS projection optical system will be described according to another exemplary embodiment of the present invention. FIG. 16 is a conceptual diagram of a unit LBS projection optical system additionally including a beam shaping element according to the other exemplary embodiment of the present invention.

The LBS projection optical system of FIG. 16 according to the other exemplary embodiment of the present invention includes R, G, and B laser diodes, condensers C1, C2, and C3 for concentrating rays of light generated by the respective R, G, and B laser diodes, dichroic mirrors (first optical elements 20) for turning the paths of the rays of light generated by the respective R, G, and B laser diodes and concentrated through the condensers C1, C2, and C3, reflecting light of a specific wavelength, and passing light of wavelengths other than the specific wavelength (e.g., the first optical element 20 dichroic mirror reflects only red light, and the first optical element 20 dichroic mirror reflects only blue light), a beam shaping element for controlling the shape of concentrated R, G, and B rays of light, at least one reflection mirror R (second optical element 30) mirror for controlling the path of a beam, and a dual-axis MEMS mirror (third optical element 40) for scanning output light on the x-y plane a predetermined distance away from the LBS projection optical system in the z-axis direction. Also, although not shown in FIG. 16, an image signal and MEMS mirror (third optical element 40) control unit for transferring input image information to the unit LBS projection optical system to supply an image signal to the respective R, G, and B laser diodes and controlling the dual-axis MEMS mirror (third optical element 40) in synchronization with the image signal may be additionally included.

The beam shaping element (i.e., the fourth optical element 50) may be a diffractive optical element (DOE), a holographic optical element (HOE), an optical element whose transmissivity of incident light varies according to a position, or so on.

Although light shown in the LBS projection optical system of FIG. 16 is indicated by a straight line to describe the path thereof for convenience, the light may not be parallel rays of light but may have a predetermined divergence angle. According to an LBS projection optical system ideal for an exemplary embodiment of the present invention, rays of light generated by the respective R, G, and B laser diodes are concentrated at the same position on the dual-axis MEMS mirror (third optical element 40), that is, the rotation-axis center position of the MEMS mirror (third optical element 40), the position becomes a point-like light source reference position, and 3D image information is scanned on the x-y plane from the point-like light source reference position according to rotation of the MEMS mirror (third optical element 40).

Light generated from such an LBS projection optical system according to an exemplary embodiment of the present invention may improve the quality of a 3D image of a 3D image display apparatus according to an exemplary embodiment of the present invention. This will be described in detail below.

Figure 17A:
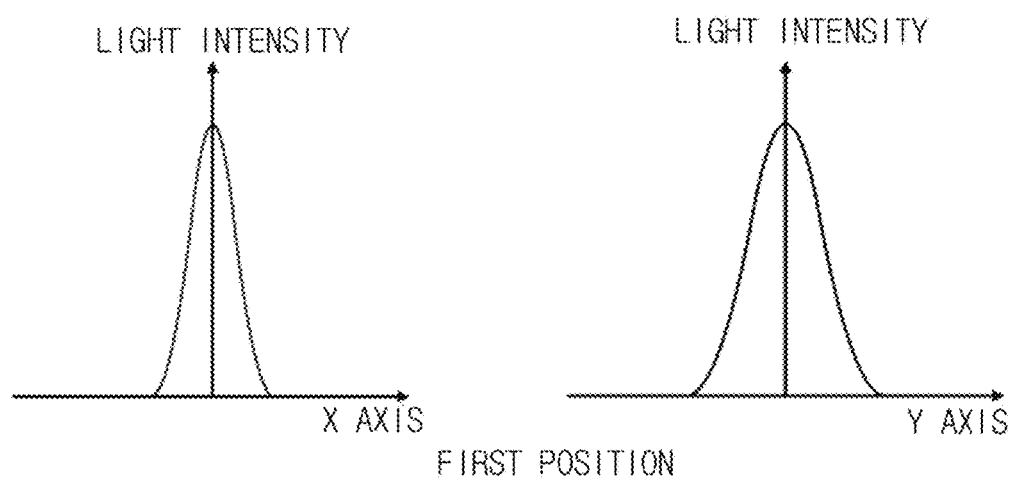
FIGS. 17A, 17B and 17C are diagrams of beam shapes formed at respective positions by a unit LBS projection optical system according to another exemplary embodiment of the present invention.
Figure 17B:
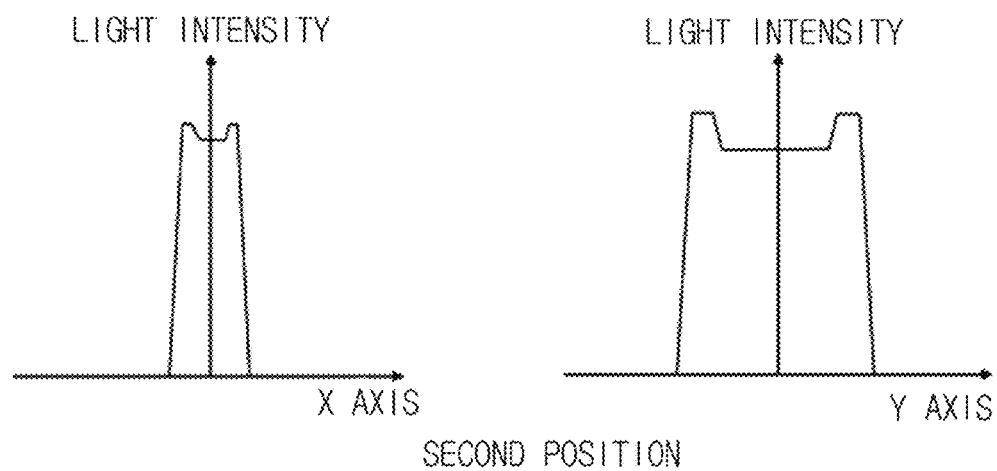
Figure 17C:
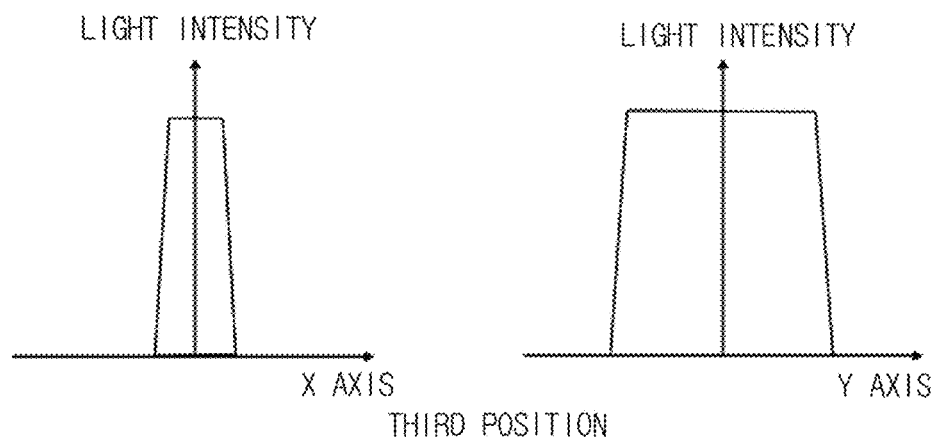

FIGS. 17A, 17B and 17C show beam shapes at indicated three positions when the LBS projection optical system of FIG. 16 according to an exemplary embodiment of the present invention has the beam shaping element and does not have the beam shaping element. The left graph of each position shows a beam shape in the x-axis direction that is a horizontal scanning direction, and the right graph of each position shows a beam shape in the y-axis direction.

At a first position in FIG. 17A, a full width at half maximum (FWHM) that is the half width of a beam shape in the horizontal scanning direction is designed to be smaller than the half width of a beam shape in a vertical scanning direction. This is because the width of a pixel in the horizontal scanning direction is determined according to the operation times of the respective R, G, and B laser light sources but the height of the pixel is determined by a beam shape in the y-axis direction. The optimal half-width ratio of such x-axis and y-axis directional beam shapes is determined according to a beam scanning speed. At a second position of FIG. 16 behind the beam shaping element, a beam shape may ideally be a rectangle having a large width in the y-axis direction on the x-y plane.

Also, as shown in FIG. 17B, x-axis and y-axis directional beam shapes may be made to have light intensity at the central portion of the beam equal to or greater than light intensity at the edge portion of the beam. This is intended to make a beam shape formed at a third position of FIG. 16 on the x-y plane a predetermined distance away from the LBS projection optical system in the z direction via the MEMS mirror (third optical element 40) of the LBS projection optical system become x-axis and y-axis directional beam shapes of FIG. 17C.

A first reason that the beam shape at the second position of FIG. 16 is required to have light intensity at the central portion of the beam equal to or greater than light intensity at the edge portion of the beam is as follows. Light output from the LBS projection optical system is similar to parallel rays of light but has a predetermined divergence angle, and the size of the beam shape increases according to a z-directional distance from the center position of the MEMS mirror (third optical element 40) in the LBS projection optical system. In this case, in the x-axis and y-axis directional beam shapes at the corresponding z position, the amount of light at the edge portion of the beam becomes less than the central portion of the beam. Another reason is as follows. Although not shown in FIG. 16, a vertical-diffusion screen for determining a vertical image size may be disposed between the LBS projection optical system and the third position of FIG. 16 to see the third position from a viewer position. The vertical-diffusion screen is an optical element that diffuses light generated from the LBS projection optical system mainly in the vertical direction (y-axis direction), but may additionally have a minor diffusion characteristic in the horizontal direction (x-axis direction) as long as x-axis directional information of a beam incident on the screen is maintained. The x-axis and y-axis directional light intensity distributions of light diffused behind the vertical-diffusion screen having such characteristics are required to be uniformized.

Figure 18A:
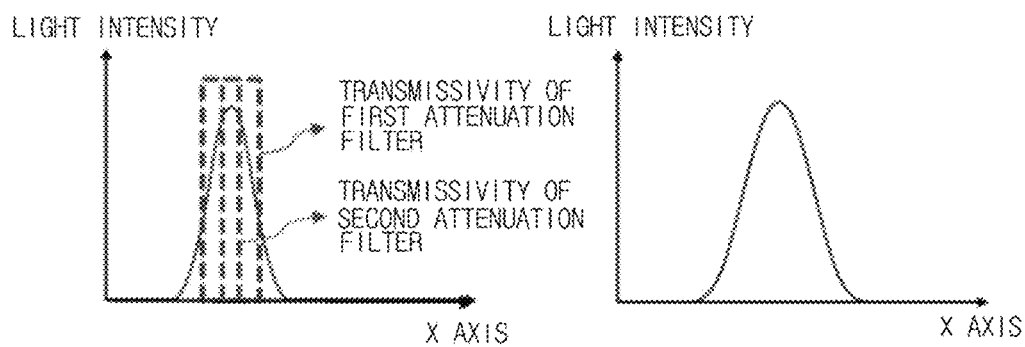
FIGS. 18A, 18B and 18C are diagrams of beam shapes at a third position when there is not a beam shaping element according to another exemplary embodiment of the present invention and there is the beam shaping element.
Figure 18B:
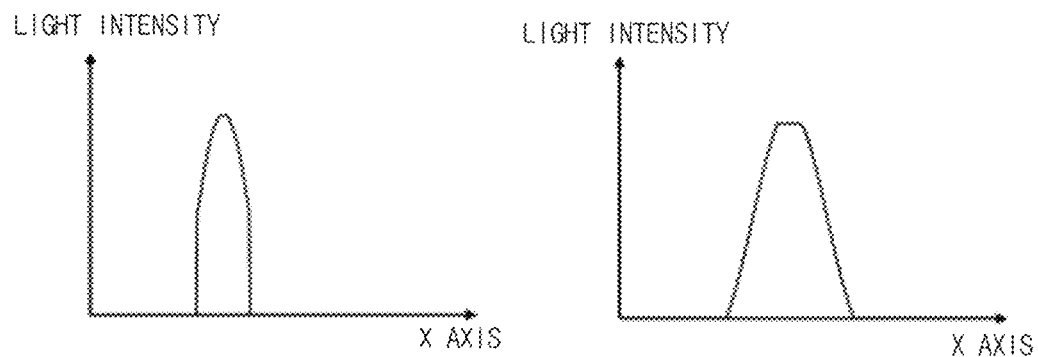
Figure 18C:
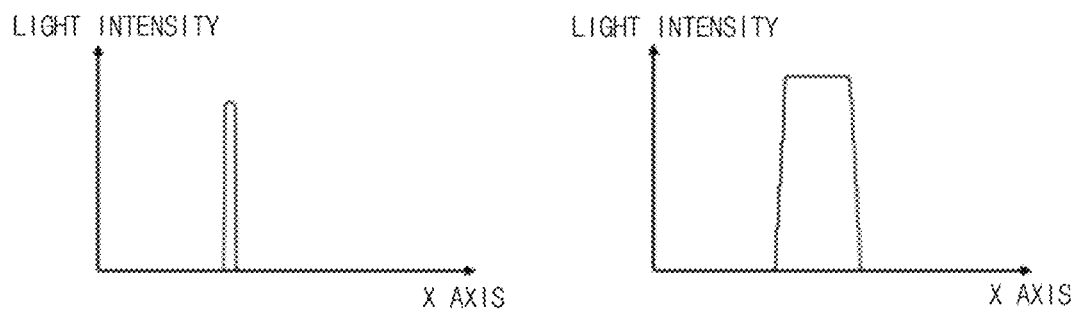
Figure 19A:
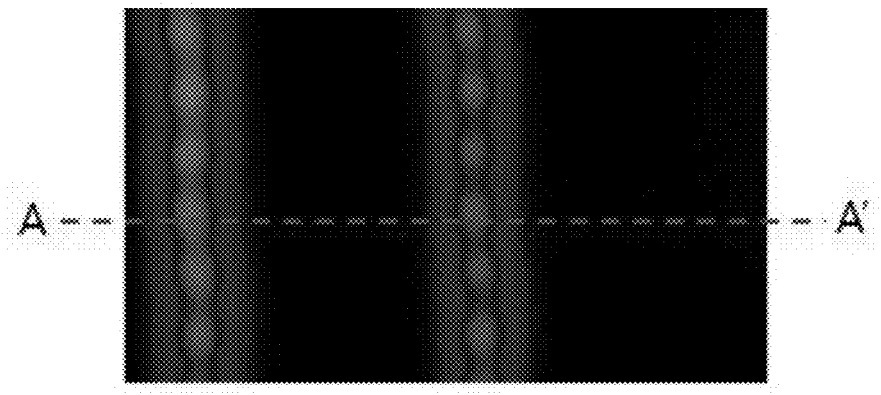
FIGS. 19A and 19B are diagrams showing vertical pixel lines and a beam shape formed on a screen at a position predetermined distance away from a general LBS projection optical system not having a beam shaping element according to another exemplary embodiment of the present invention.
Figure 19B:
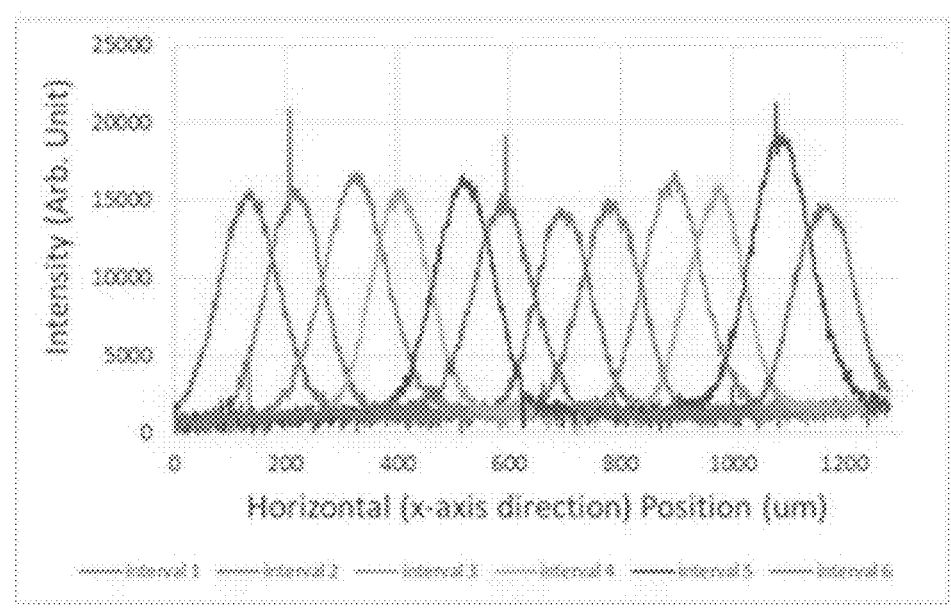
Figure 20A:
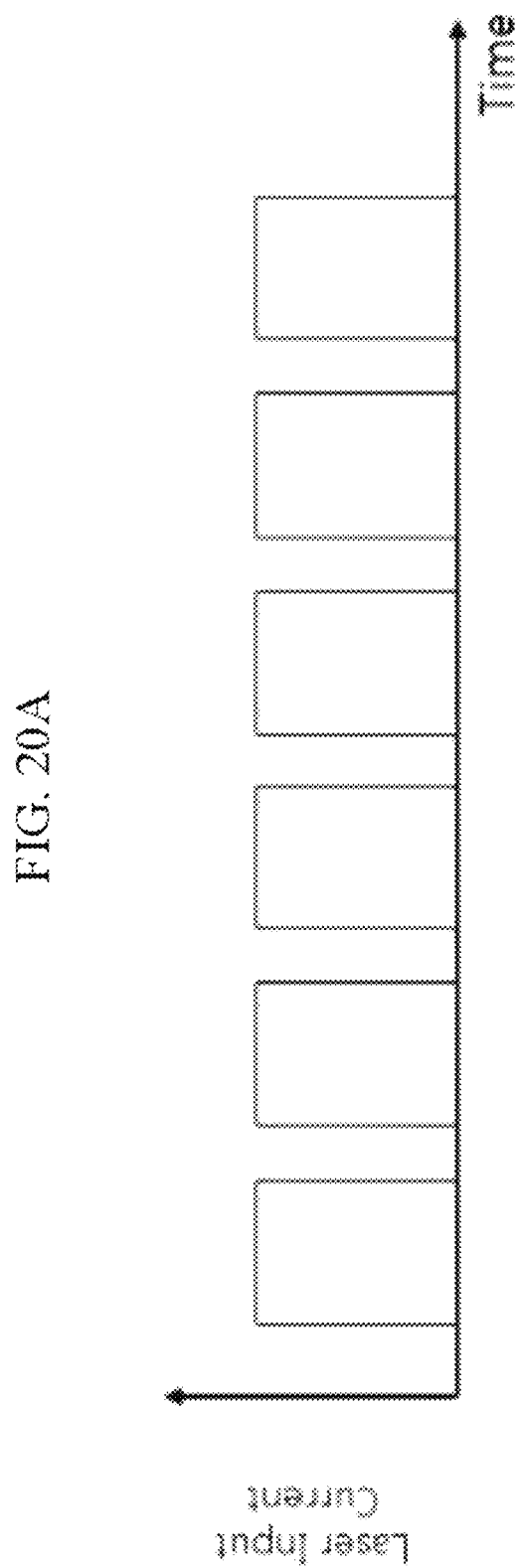
Figure 20C:
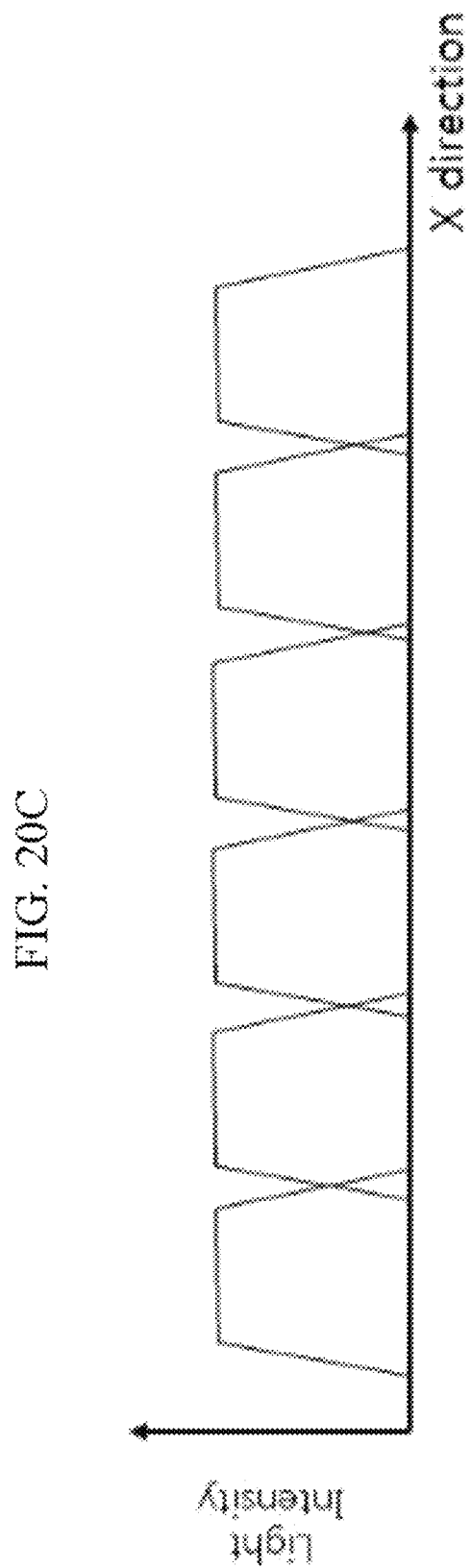
FIG. 20C is a diagram showing ideal viewing zones in which crosstalk between adjacent viewing zones is minimized.

Another exemplary embodiment of the present invention implementing the above-described light intensity shape in FIG. 17B or 17C will be described with reference to FIGS. 18A, 18B, 18C, 19A and 19B. FIGS. 18A, 18B and 18C are diagrams of beam shapes at a third position when there is not a beam shaping element according to another exemplary embodiment of the present invention and there is the beam shaping element, and FIGS. 19A and 19B are diagrams showing vertical pixel lines and a beam shape formed on a screen at a position predetermined distance away from a general LBS projection optical system not having a beam shaping element according to another exemplary embodiment of the present invention. FIGS. 20A and 20B are diagrams showing laser input current over time, and FIG. 20C is a diagram showing ideal viewing zones in which crosstalk between adjacent viewing zones is minimized.

The horizontal-direction (x-axis direction) beam shape at the third position in a case in which there is not a beam shaping element has the Gaussian form as shown in the left graph of FIG. 18A. When a laser pulse shown in FIG. 20A is applied according to unit-pixel-specific times using such a beam shape, a beam shape corresponding to a unit horizontal pixel at the third position and accumulatively formed over time also has the Gaussian form as shown in the right graph of FIG. 18A.

These results differ from the ideal square shapes shown in FIG. 17C, and coincide with experimental results shown in FIG. 19B verified using a general LBS projection optical system. Data shown in FIG. 19A is one vertical pixel line formed on a screen 600 mm away from a general LBS projection optical system having no commercialized beam shaping element and another vertical pixel line apart from six adjacent horizontal pixels. A beam shape of the data on the screen at a cross section A-A' is indicated by interval 1 in FIG. 19B.

When the two operating pixel lines shown in FIG. 19A are moved by one pixel in the horizontal direction to measure a beam shape on the screen at the same cross section A-A', entire data results including data of interval 2 to interval 6 are obtained as shown in FIG. 19B. Each beam shape formed in the horizontal direction in the entire data corresponds to one pixel at a screen position for measurement. In addition, in the above-described 3D display system of FIG. 11 according to an exemplary embodiment of the present invention, each beam shape becomes a unit viewing zone in the horizontal direction.

In other words, FIG. 19B becomes 12 pieces of horizontal-direction unit viewing-zone data. In this case, the amount of crosstalk between adjacent unit viewing zones increases, and it is difficult to rightly display a 3D image with excellent depth perception. To solve this problem, the beam shaping element of FIG. 16 may be added. As the beam shaping element (i.e., the fourth optical element 50), a light attenuation filter, a DOE, or an HOE may be used.

When such a beam shaping element is applied behind the first position to remove light outside the FWHM of a beam shape, which is light distribution in the Gaussian form at the first position of FIG. 16, as shown in the left graph of FIG. 18A, the beam shape of one pixel formed by horizontal-direction scanning may be transformed into a trapezoid.

As an example, when a first attenuation filter shown in FIG. 18A is used, an initial beam shape may be transformed as shown in the left graph of FIG. 18B. In this case, a beam shape corresponding to the shape of one pixel formed by horizontal-direction scanning becomes the trapezoid shown in FIG. 18B.

A second attenuation filter shown in FIG. 18A transmits only a fifth of the horizontal FWHM of a beam emitted from an LBS projection optical system. The shape of the beam emitted from the LBS projection optical system and formed in this case is as shown in the left graph of FIG. 18C. A beam shape corresponding to one pixel and formed by horizontal-direction scanning of a beam emitted from the LBS projection optical system becomes similar to an ideal square viewing zone.

In this way, when an appropriate light attenuation filter is used as the beam shaping element, a beam shape in the horizontal scanning direction corresponding to one pixel or one viewing zone is made similar to a square viewing zone, so that the amount of crosstalk between adjacent viewing zones of a 3D system as shown in FIG. 11 according to an exemplary embodiment of the present invention may be minimized.

To form ideal square viewing zones, a light attenuation filter having a smaller projection area than the FWHM of a projection beam is preferred. However, since the amount of light of one projection beam is reduced, a used light attenuation filter may transmit a beam having an area larger than a tenth of the FWHM of a projection beam and smaller than the FWHM.

When a laser input signal is applied for most of a horizontal-direction scanning time corresponding to one pixel as shown in FIG. 20A, each beam shape that is shown on the right side of FIGS. 18A, 18B and 18C, formed by horizontal-direction scanning, and corresponds to the one pixel is made from each beam shape on the left side of FIGS. 18A, 18B and 18C. In this case, the amount of crosstalk between viewing zones adjacent in the horizontal direction may be remarkably reduced (see FIG. 20C).

In another method of forming viewing zones as shown in FIG. 20C according to an exemplary embodiment of the present invention, a square viewing zone in which the size of a scanning-direction (x-axis direction) beam shape of a projection beam of an LBS projection optical system corresponds to the size of a beam shape in a direction (y-axis direction) normal to the projection direction is formed in the projection direction (x-axis direction) by the method described above with reference to FIGS. 17A, 17B, 17C, 18A, 18B and 18C. Then, even when a laser input signal is applied for only a time equal to or less than a predetermined ratio of a horizontal-direction scanning time T corresponding to one pixel as shown in FIG. 20B, it is possible to form ideal viewing zones in which crosstalk between adjacent viewing zones is minimized as shown in FIG. 20C.

The predetermined ratio of the horizontal-direction scanning time T corresponding to one pixel may be larger than 0 and smaller than 0.3. The size of a beam in a beam scanning direction (x-axis direction) is smaller than the size of the beam in a direction (y-axis direction) normal to the scanning direction. As the size ratio is reduced, it is advantageous to increase the time for applying the input signal within the horizontal-direction scanning time T corresponding to one pixel. However, to minimize crosstalk between formed adjacent viewing zones and uniformize brightness, the laser input signal may be applied for a time equal to or less than the predetermined ratio of the horizontal-direction scanning time T corresponding to one pixel.

Figure 21A:
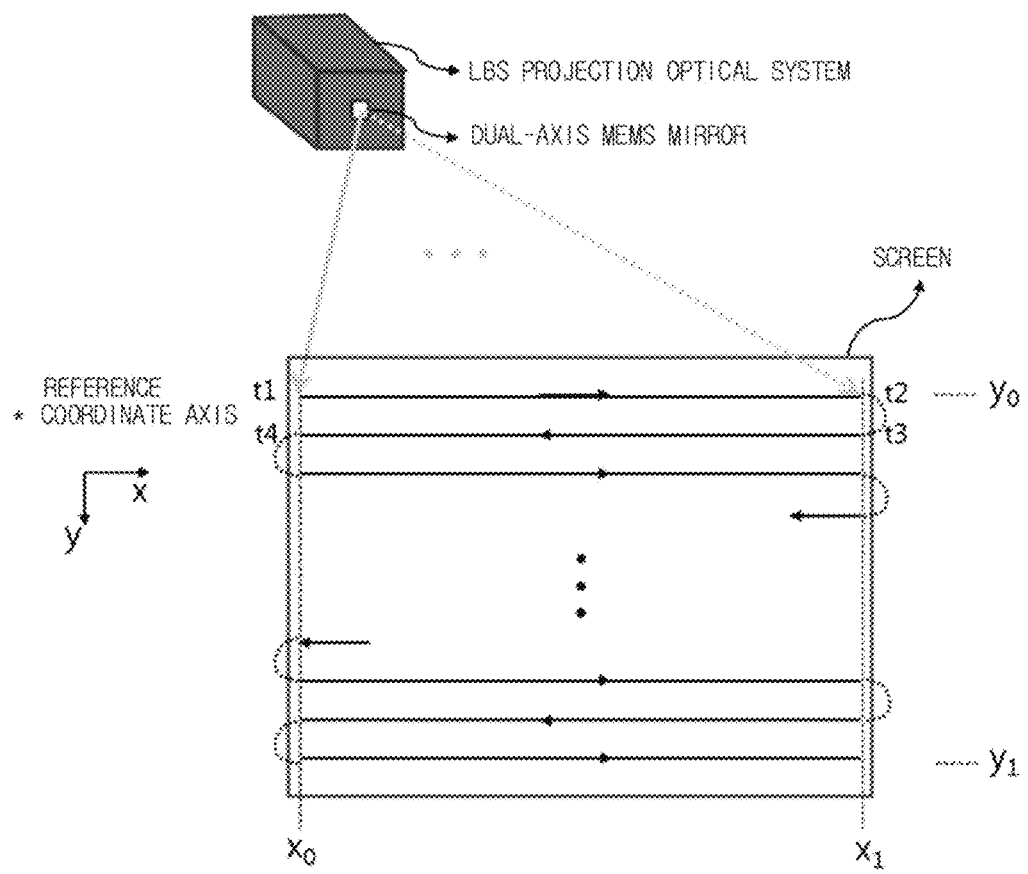
FIGS. 21A and 21B are diagrams showing two structures of a unit LBS projection optical system used in a 3D image display apparatus according to exemplary embodiments of the present invention.
Figure 21B:
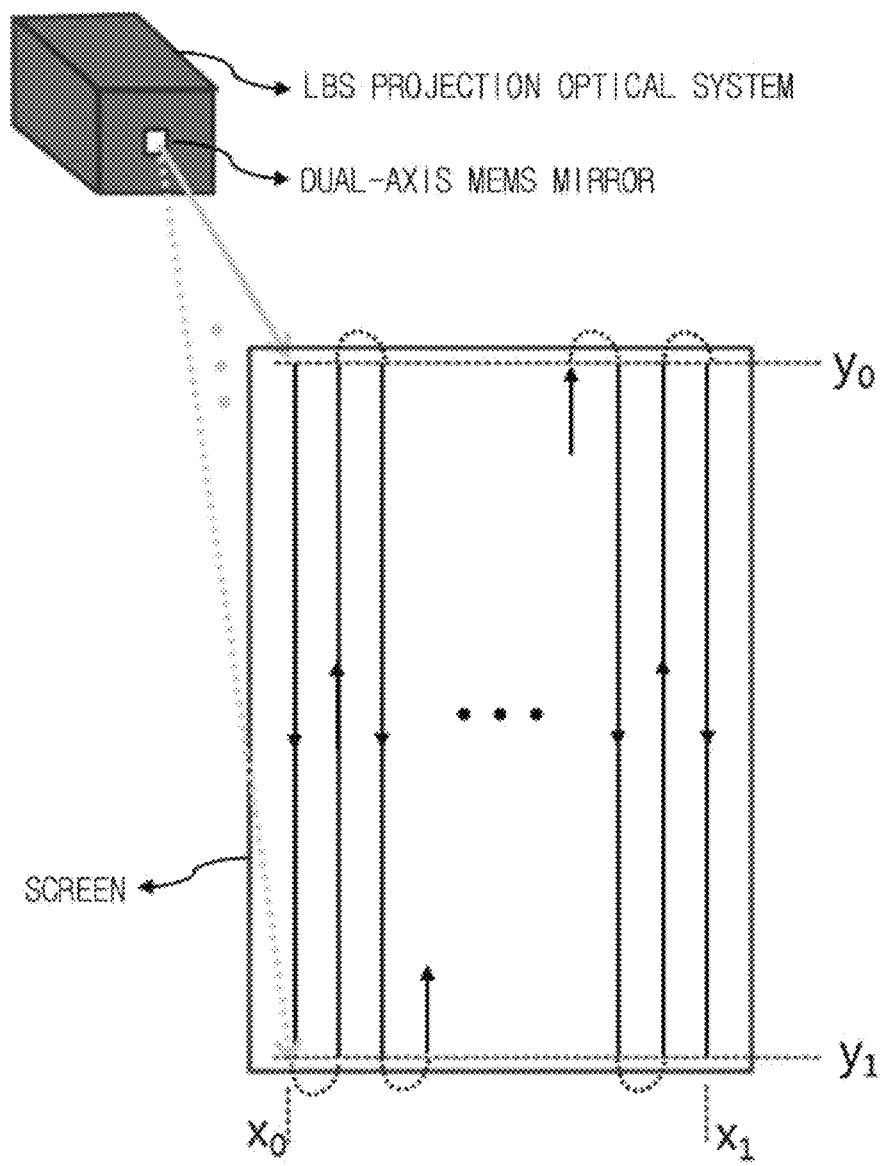

There are two scanning directions of a unit LBS projection optical system for implementing a 3D image display apparatus using a plurality of LBS projection optical systems according to an exemplary embodiment of the present invention. FIGS. 21A and 21B are diagrams showing two structures of a unit LBS projection optical system used in a 3D image display apparatus according to an exemplary embodiments of the present invention. FIG. 21A shows a horizontal scanning direction structure, and FIG. 21B shows a vertical scanning direction structure. A unit LBS projection optical system may be disposed to perform scanning in the x-axis direction that is a horizontal parallax direction (FIG. 21A) or in the y-axis direction (FIG. 21B).

The two dispositions of a unit LBS projection optical system may be implemented using a 3D image display apparatus according to an exemplary embodiment of the present invention. In this case, vertical pixels of an image formed on a screen through scanning may be implemented as the same viewpoint image.

The amount of crosstalk, which is the degree of overlap between horizontally adjacent viewing zones of a horizontal-parallax 3D image display apparatus forming only horizontal parallax as shown in FIG. 11 according to an exemplary embodiment of the present invention or a full-parallax 3D image display apparatus providing images implementing both horizontal and vertical parallax as shown in FIG. 13, determines expressible depth of a 3D image and is closely related to visual fatigue of a viewer who views the 3D image. Therefore, in connection with the above-described structure according to an exemplary embodiment of the present invention in which the position of an MEMS mirror (third optical element 40) of each LBS projection optical system becomes a 3D pixel or pixel line and the number of LBS projection optical systems used in a system becomes the resolution of a 3D image shown to a viewer, another exemplary embodiment of the present invention for minimizing crosstalk between adjacent viewing zones, uniformizing brightness distribution in the same viewing zone, and providing 3D images having uniform brightness while the viewer moves between adjacent viewing zones will be described with reference to FIGS. 22A to 24C.

Figure 22A:
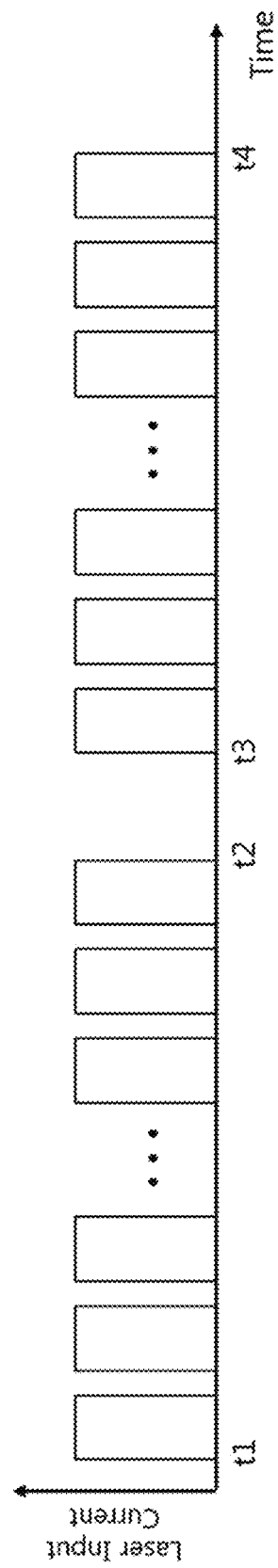
FIGS. 22A, 22B and 22C are diagrams illustrating operation of a laser light source and a principle of forming resultant viewing zones in a horizontal direction (x-axis direction) based on light output units (i.e., the third optical element 40, e.g., the micro-electro-mechanical system (MEMS) mirrors) of unit LBS projection optical systems in an LBS projection optical system disposition shown in FIG. 21A.
Figure 22B:
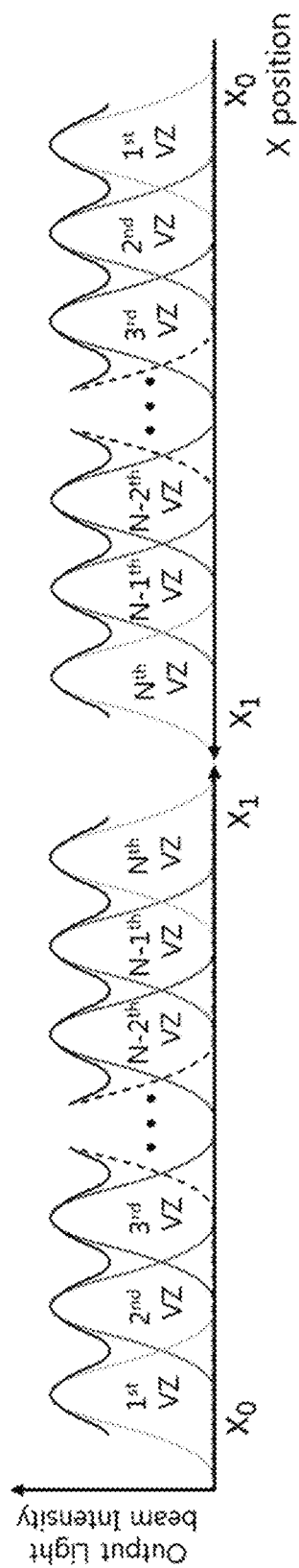
Figure 22C:
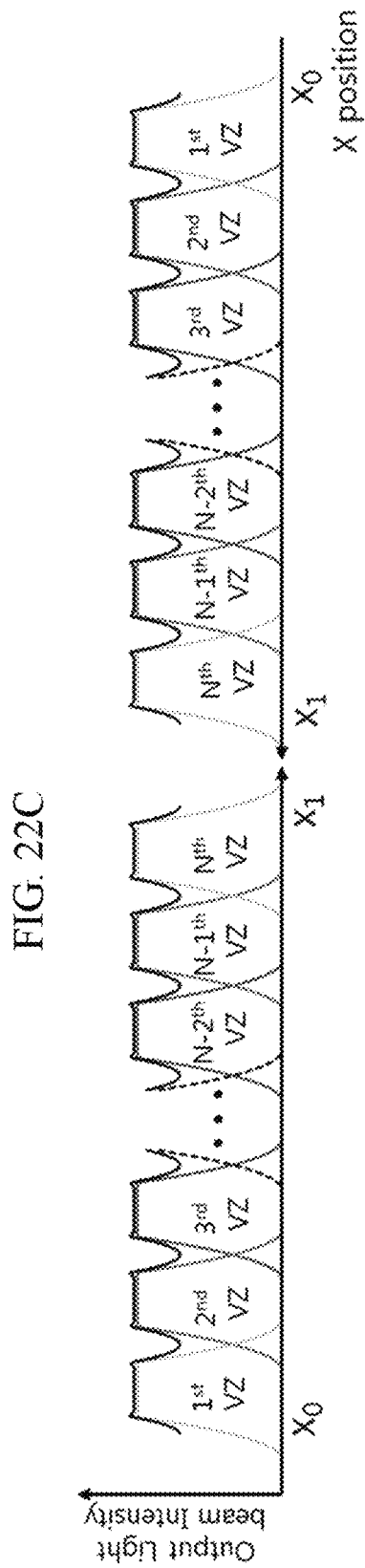

FIGS. 22A, 22B and 22C are diagrams illustrating operation of a laser light source and a principle of forming resultant viewing zones in the horizontal direction (x-axis direction) based on light output units (third optical element 40, e.g., the MEMS mirrors) of unit LBS projection optical systems in the LBS projection optical system disposition shown in FIG. 21A. FIG. 22A shows input current of laser light sources over time, FIG. 22B shows the distribution of viewing zones spatially formed by general unit LBS projection optical systems, and FIG. 22C shows the distribution of viewing zones spatially formed by unit LBS projection optical systems additionally including a beam shaping element.

Figure 23:
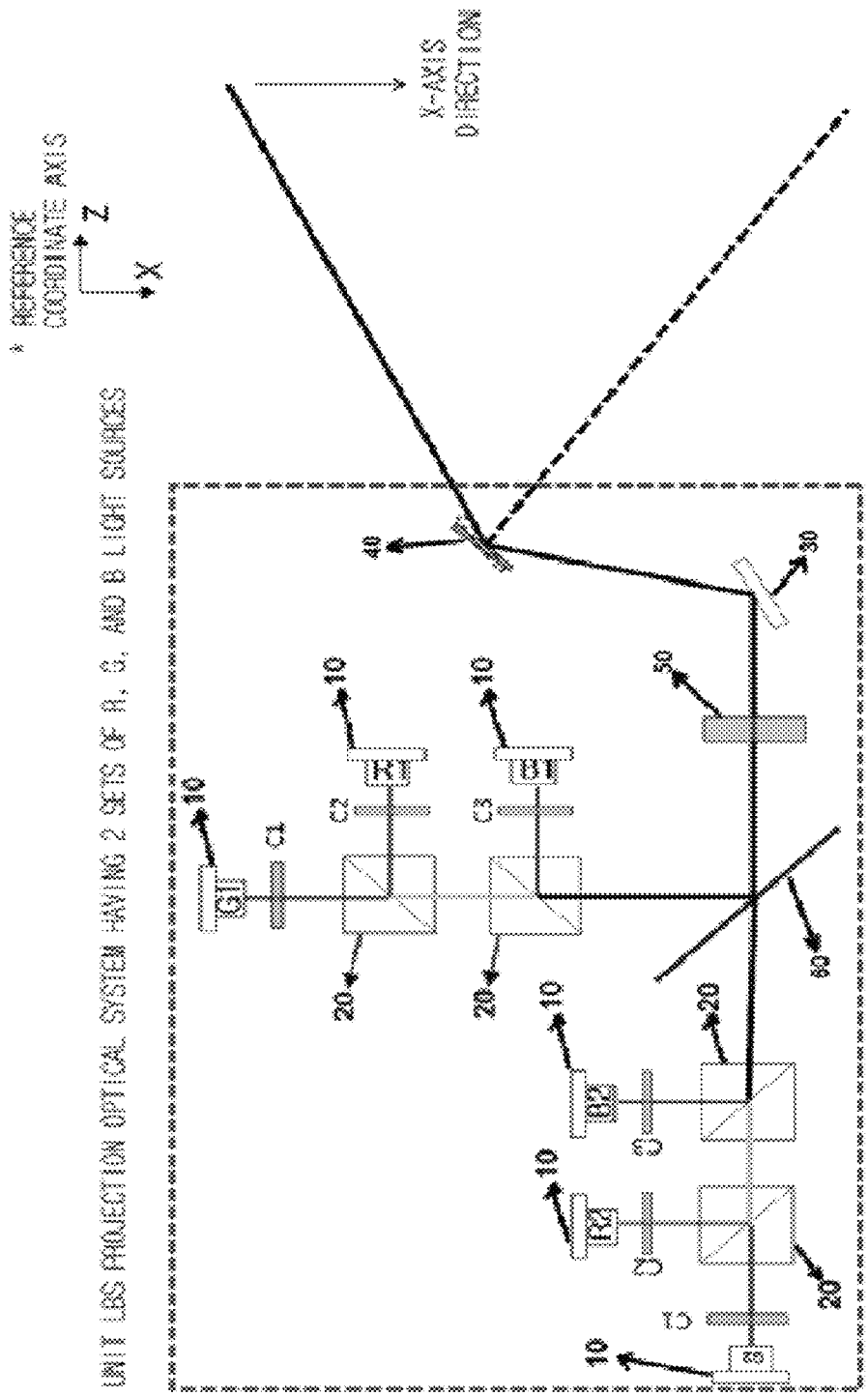
FIG. 23 is a diagram showing an example of the configuration of a unit LBS projection optical system for generating 3D image information using two sets of R, G, and B laser light sources according to an exemplary embodiment of the present invention.

FIG. 23 is a diagram showing an example of the configuration of a unit LBS projection optical system for generating 3D image information using two sets of R, G, and B laser light sources according to an exemplary embodiment of the present invention.

Figure 24A:
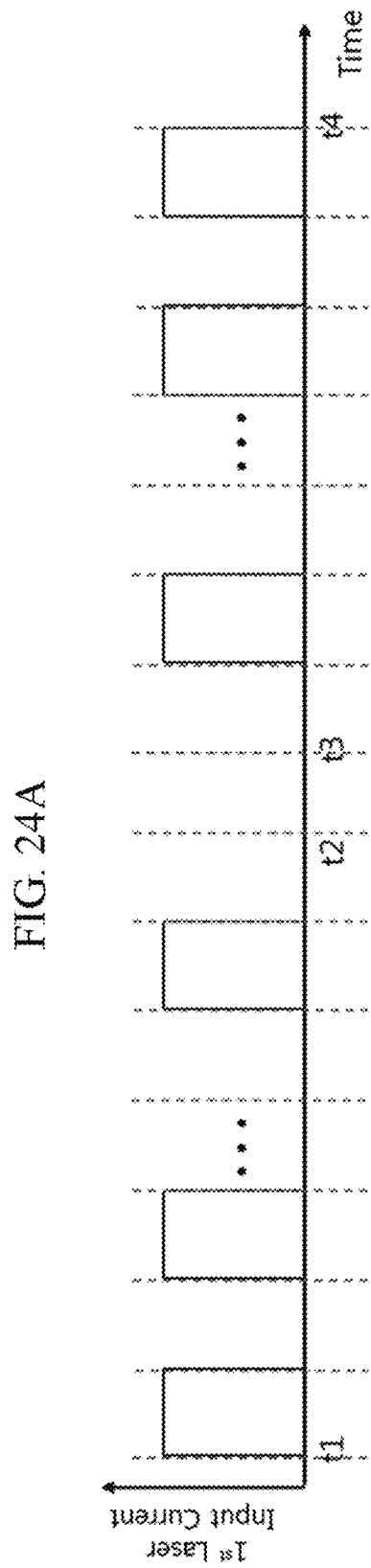
FIGS. 24A, 24B and 24C are diagrams illustrating operation of a laser light source and a principle of forming resultant viewing zones in the horizontal direction (x-axis direction) based on light output units (third optical element 40 e.g., MEMS mirrors) of unit LBS projection optical systems when the LBS projection optical system of FIG. 23 having two sets of R, G, and B laser light sources according to an exemplary embodiment of the present invention is used in a disposition structure shown in FIG. 21A.
Figure 24B:
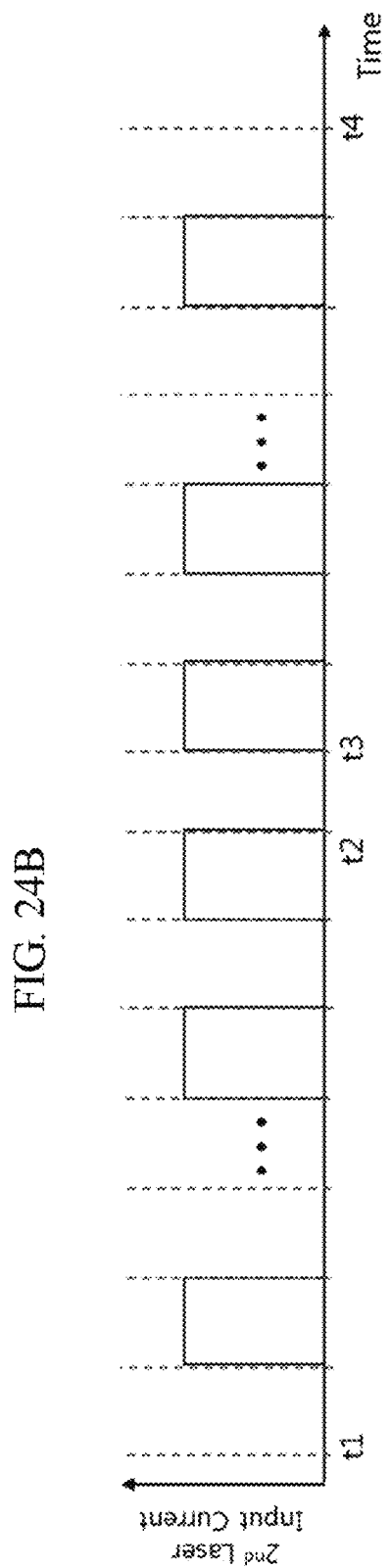
Figure 24C:
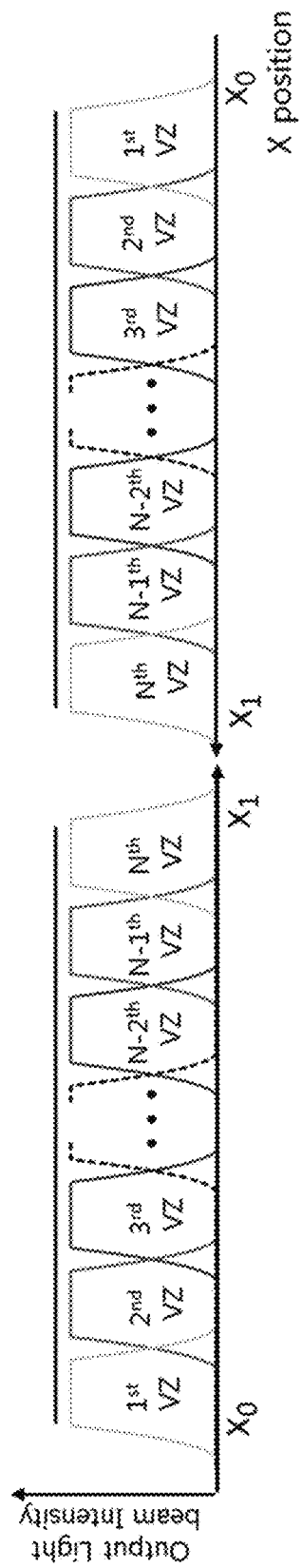

FIGS. 24A, 24B and 24C are diagrams illustrating operation of a laser light source and a principle of forming resultant viewing zones in the horizontal direction (x-axis direction) based on the light output unit (i.e., the third optical element 40, e.g., the MEMS mirror) of a unit LBS projection optical system when the LBS projection optical system of FIG. 23 having two sets of R, G, and B laser light sources according to an exemplary embodiment of the present invention is used in a disposition structure shown in FIG. 21A. FIG. 24A shows input current of first R, G, and B laser light sources over time, FIG. 24B shows input current of second R, G, and B laser light sources over time, and FIG. 24C shows the horizontal-direction distribution of viewing zones formed at a viewer position of a unit LBS projection optical system including the first laser light sources and the second laser light sources.

For convenience, description will be made based on the case of FIG. 21A in which respective LBS projection optical systems are disposed in the horizontal scanning direction structure in an LBS projection optical system array, but the concept of the present invention may also be applied to the vertical scanning direction structure of FIG. 21B.

When a horizontal-parallax 3D image display apparatus is implemented using the LBS projection optical system array of FIGS. 10 to 12, 3D horizontal viewing zones are formed in a space from each unit LBS projection optical system as shown in FIG. 21A. At this time, each laser light source operates over time as shown in FIG. 22A. When the horizontal resolution of each LBS projection optical system is N, the distribution of viewing zones formed at a viewer position behind a vertical-diffusion screen by a time-variant driving signal of FIG. 22A is shown in FIGS. 22B and 22C.

Specifically, each of the R, G, and B laser light sources applies 3D viewing zone information to N horizontal pixels for a predetermined horizontal scanning time ($\Delta t = t2-t1 = t4-t3$). When a time assigned to each horizontal pixel is defined as T(pixel) and a time for which each of the R, G, and B laser light sources may apply voltage to each horizontal pixel in synchronization with image information is defined as To(pixel), To(pixel) is shorter than T(pixel). At this time, when the scanning times of all horizontal pixels are uniformly adjusted by appropriately controlling the rotary angular velocity of the MEMS mirror (third optical element 40) of the LBS projection optical system in a scanning direction, T(pixel) may be ideally $\Delta t/N$. However, according to an actual LBS projection optical system, T(pixel) and To(pixel) assigned to each horizontal-direction pixel in the scanning direction may not be uniform. Even in this case, the relationship of To(pixel) being shorter than T(pixel) is maintained.

The difference between To(pixel) and T(pixel) may be adjusted according to the reaction times of the used laser light sources to on-off of applied current and the image signal processing speed of the laser light sources. Also, when a horizontal scanning direction is the positive x-axis direction, the next horizontal scanning direction is the negative x-axis direction. By adjusting the MEMS mirror (third optical element 40) of the LBS projection optical system in the y-axis direction, a scanning direction is moved by the vertical distance of one pixel after one horizontal-direction scanning.

In connection with distribution of viewpoint images according to an exemplary embodiment of the present invention, horizontal viewing-zone information is input to respective pixels arranged in the horizontal direction by such a time-variant driving signal of the R, G, and B laser light sources of the LBS projection optical system, thereby forming N horizontal viewing zones. For example, during a first scanning period (between t1 to t2), scanning is performed in an $x_0$-to-$x_1$ direction, and first to $N^{th}$ viewing zones are formed in sequence at respective horizontal pixels. During a second scanning period (between t3 to t4), a pixel row to be scanned is moved down by one pixel in the vertical direction, and scanning is performed in an $x_1$-to-$x_0$ direction that is the reverse direction of the first scanning period, and $N^{th}$ to first viewing zones are formed in sequence at respective horizontal pixels (see FIGS. 22B and 22C).

In this way, 3D viewing zones, which are related to the time-variant driving signal of the R, G, and B laser light sources for providing 3D image information according to each LBS projection optical system, are formed in two opposite directions according to adjacent scanning periods. This is a method of forming 3D viewing zones when raster scanning of an LBS projection optical system is alternately performed in two opposite directions (i.e., when scanning is performed in +x direction during a first scanning period and in −x direction during a second scanning period) as shown in FIGS. 21A and 21B.

When an LBS projection optical system used in an exemplary embodiment of the present invention performs scanning in a single horizontal direction (i.e., when scanning is performed in +x direction or −x direction during all scanning periods), sequences of forming viewing zones over time according to horizontal scanning periods may be identical, unlike the description of the above example.

FIG. 22B shows the shape and the disposition of viewing zones formed at a viewer position when an LBS projection optical system has no beam shaping element therein, and FIG. 22C shows that viewing zones having planar center portions are formed at a viewer position when an LBS projection optical system additionally has a beam shaping element therein. The amount of crosstalk between adjacent viewing zones whose center portions are flat as shown in FIG. 22C is reduced compared to the amount of crosstalk between adjacent viewing zones formed by an LBS projection optical system having no beam shaping element, and also the uniformity of brightness in a viewing zone is improved. However, there is the same tendency toward a reduction in the brightness of an area between adjacent viewing zones compared to the center portions of the respective viewing zones. Such a reduction occurs because the time To(pixel) assigned to each horizontal pixel so as to supply image information is shorter than the time T(pixel) assigned to each horizontal pixel in consideration of a horizontal resolution and a horizontal scanning time. Therefore, by improving laser light sources, image signal processing speed, etc., it is possible but difficult to correct the non-uniformity of brightness between a center portion and an edge portion of a viewing zone. Also, it is difficult to simultaneously correct the non-uniformity and reduce the amount of crosstalk between adjacent viewing zones in connection with each other.

The concept of a unit LBS projection optical system devised to solve such a problem according to another exemplary embodiment of the present invention is shown in FIG. 23. FIG. 23 is a diagram showing an example of the configuration of a unit LBS projection optical system for generating 3D image information using two sets of R, G, and B laser light sources according to another exemplary embodiment of the present invention.

FIG. 23 shows only an optical system portion of the LBS projection optical system, but the LBS projection optical system may include a non-shown control unit that receives 3D image information, provides the image information to the respective two sets of R, G, and B laser light sources according to color image signals over time, and rotates a dual-axis MEMS mirror (third optical element 40) in synchronization with the scanning positions of respective images.

The two sets of R, G, and B laser light sources of FIG. 23 separately provide pieces of horizontal-direction pixel information in sequence of time as shown in FIGS. 24A and 24B. An exemplary embodiment of the present invention shows a case in which a first set of R, G, and B laser light sources supplies an image signal to odd-numbered horizontal pixels, and a second set of R, G, and B laser light sources supplies the image signal to even-numbered horizontal pixels. In this case, unlike the case of FIG. 22A in which only one set of R, G, and B laser light sources is used, the time To(pixel) for which each of the R, G, and B laser light sources may apply voltage to each horizontal pixel in synchronization with image information may be made equal to or longer than the time T(pixel) assigned to each horizontal pixel within a predetermined range in consideration of the horizontal-direction resolution (number N of horizontal pixels) of the LBS projection optical system and an assigned horizontal scanning time ($\Delta t = t2 - t1 = t4 - t3$). Therefore, it is possible to freely adjust the R, G, and B laser driving time To(pixel) assigned to each pixel within an adjacent pixel range.

Also, when beams including image information and emitted from the two sets of laser light sources are combined by a fifth optical element 60 such as an HRT mirror, and finally incident on the MEMS mirror (third optical element 40) through a reflection mirror (second optical element 30) for turning a path, etc. in the unit LBS projection optical system, the image information is distributed to a 3D space by rotation of the MEMS mirror (third optical element 40). Here, to make the shape of the beams including image information and emitted from the two sets of R, G, and B laser light sources as shown in FIGS. 17A and 17B, at least one beam shaping element may be included in an optical path.

As a result, by adjusting the R, G, and B laser driving time per one appropriate pixel, it is possible to form unit viewing zones whose center portions are flat at a viewer position behind a vertical-diffusion screen as shown in FIG. 24C, and to correct the non-uniformity of brightness between the central portion of a unit viewing zone and a boundary area with an adjacent viewing zone. Also, the shape of viewing zones becomes similar to a trapezoid, and crosstalk between adjacent viewing zones is reduced, so that a 3D image with excellent depth perception may be displayed. Such a 3D image display apparatus according to an exemplary embodiment of the present invention may increase the 3D effect of a 3D image while minimizing the fatigue feeling of a viewer who views a 3D image, thus providing an immersive and comfortable 3D image to the viewer.

The structure of a unit LBS projection optical system of FIG. 23 according to an exemplary embodiment of the present invention is intended to describe the basic concept in brief. As optical systems, two or more sets of R, G, and B laser light sources may be used, and a structure for concentrating light of two or more sets of optical systems on one path is not limited to FIG. 23 shown as this exemplary embodiment.

Another exemplary embodiment of the present invention for uniformizing the light intensity of a viewing zone formed at a view position and minimizing crosstalk between adjacent viewing zones will be described below with reference to FIGS. 25 to 27C.

FIG. 25 is a conceptual diagram illustrating a relationship between an entire viewing-zone range (VZ width) and a viewpoint interval (VP interval) formed at a view position based on a unit LBS projection optical system according to an exemplary embodiment of the present invention. FIG. 25 shows a case in which light is emitted from the output unit (i.e., the third optical element 40 e.g., the MEMS mirror) of each unit LBS projection optical system in an array of a plurality of LBS projection optical systems and forms 3D horizontal viewing zones at an $L_o$ position through a vertical-diffusion screen disposed at an $L_s$ position.

Here, $L_s$ is the distance from the output unit of the unit LBS projection optical system to the position of the vertical-diffusion screen and determines the vertical size of a 3D image picture. Also, although not shown in the drawing, the horizontal size of a 3D image picture is determined to be a length $W_s$ of a horizontal-direction array of the reference positions of projection optical systems as shown in FIG. 11.

The size (VZ width) of entire viewing zones formed in the horizontal direction (x-axis direction) at the $L_o$ position by the unit LBS projection optical system relates to a maximum x-direction movement angle $\theta_x$ of light output from the unit LBS projection optical system, and the size of entire viewing zones formed at a distance of $L_o$ in the z direction from the position of the output unit of the unit LBS projection optical system is shown in relational expression (1) of FIG. 25.

Also, a distance (VP interval) between adjacent viewpoints at a distance of $L_o$ in the z direction from the position of the output unit of the LBS projection optical system is calculated by dividing the entire viewing-zone size (VZ width) at the position of $z=L_o$ by a horizontal-direction resolution (or the number of pixels in the horizontal direction) (see relational expression (2) of FIG. 25).

Figure 26A:
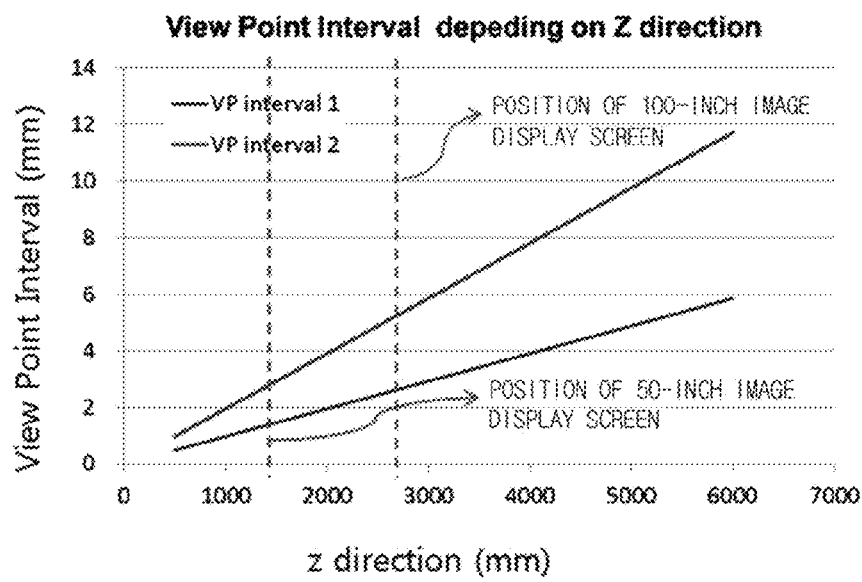
FIGS. 26A and 26B show graphs of viewpoint interval and viewing-zone width depending on a z-directional position formed based on a unit LBS projection optical system having a resolution of 848(H)×380(V) and $θ_x$ of 45 degrees according to an exemplary embodiment of the present invention.
Figure 26B:
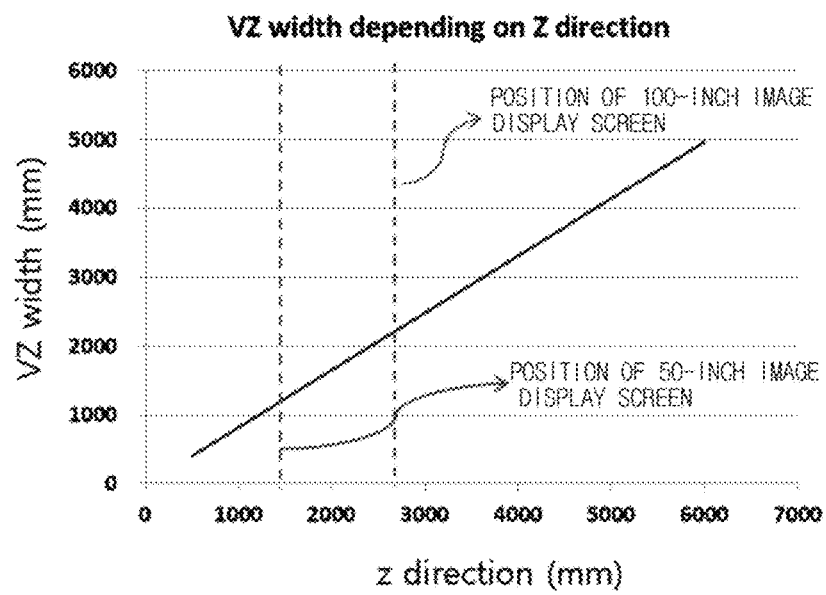

As an example, when the resolution of the unit LBS projection optical system is 848(H)×480(V) and a maximum horizontal-direction scanning angle is $\theta_x$, an entire horizontal-direction viewing-zone size calculated using relational expressions (1) and (2) of FIG. 25 according to a z-directional distance is shown in FIG. 26B. FIGS. 26A and 26B show graphs of viewpoint interval and viewing-zone width depending on a z-directional position based on a unit LBS projection optical system having a resolution of 848(H)× 380(V) and $\theta_x$ of 45 degrees according to an exemplary embodiment of the present invention. FIG. 26B is a graph showing the relationship between the entire horizontal-direction (x-axis direction) viewing-zone size (VZ width) and a z-directional position.

The positions of 50-inch and 100-inch image display screens shown in FIG. 26B are calculated based on the diagonal length of a 3D image picture when horizontal-direction image sizes related to the horizontal-direction size of an array of a plurality of LBS projection optical systems are formed at the same ratio based on a vertical-direction size.

The position of a vertical-diffusion screen for obtaining an image size of 50 inches is z=~1350 mm, and the position of a vertical-diffusion screen for obtaining an image size of 100 inches is z=~2700 mm. A view range in which a viewer may see a 3D image using such a unit LBS projection optical system array (see FIGS. 10 and 11) is a predetermined range in the depth direction from behind the vertical-direction diffusion screen.

The size of entire viewing zones formed by each LBS projection optical system linearly increases with an increase in a z-directional distance. The graph of viewpoint interval 1 (VP interval 1) in FIG. 26A denotes a viewpoint interval depending on a depth-directional (z-axis directional) position when a single viewing zone is formed according to each horizontal pixel. The viewpoint interval increases in proportion to the depth-directional distance. For example, assuming that a viewer sees a 3D image at a range of z=2000 mm to z=4000 mm when the vertical-diffusion screen is disposed at a position of z=1350 mm to implement a 50-inch image, the viewpoint interval becomes 2 mm to 3.9 mm in this range. The average pupil size of a viewer changes within a range from 2 mm to 8 mm, but is generally considered about 5 mm. In this case, in the above view range, a viewpoint interval includes a super multi-view region in which two or more viewpoints enter one pupil, and a viewpoint smaller than the average pupil size is established in the view range and present in a quasi super multi-view region.

When the implementation of an ideal super multi-view system using an array of projection optical systems becomes an important design factor, an LBS projection optical system having a higher resolution than the LBS projection optical system mentioned above as an example may be used. In this case, even when the LBS projection optical system has the same scanning movement angle and the same 3D image display picture size, an area in which it is possible to view a super multi-view image enlarges.

However, when a factor of using the range of a quasi super multi-view region or a multi-view region, improving the depth perception of a 3D image by minimizing crosstalk between adjacent viewing zones, and uniformizing brightness of the 3D image is more important than a factor of implementing a 3D image display apparatus for enlarging a super multi-view region, it may be preferable to combine two or more adjacent horizontal viewing zones and provide one piece of viewing-zone information. For example, VP interval 2 in FIG. 26A is a graph of a viewpoint interval versus a depth-directional position when two adjacent horizontal viewing zones are combined. In this case, the number of horizontal viewing zones is reduced to half the horizontal resolution, and when a depth-directional position for viewing a 3D image ranges from z=2000 mm to z=4000 mm, the viewpoint interval of the corresponding area doubles to 4 mm to 7.8 mm.

Figure 27A:
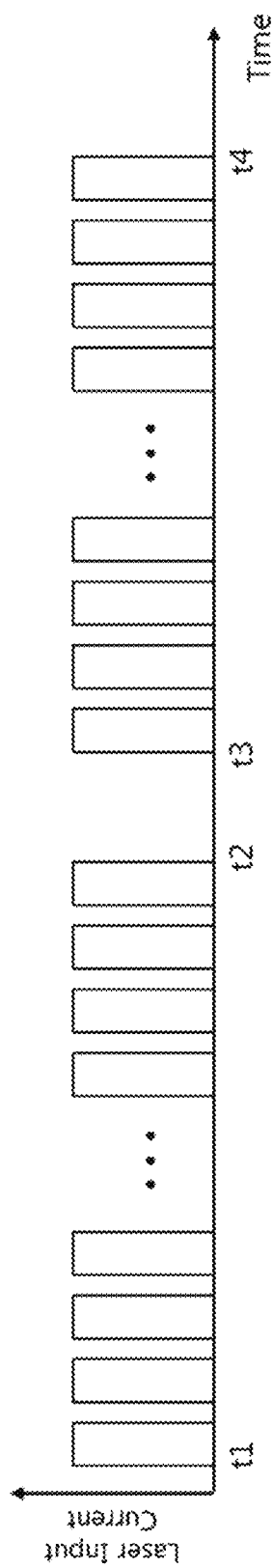
FIGS. 27A, 27B and 27C are diagrams illustrating a principle of combining two unit viewing zones formed in the horizontal direction into one viewing zone based on a light output unit (i.e., a third optical element 40, e.g., a MEMS mirror) of one unit LBS projection optical system according to an exemplary embodiment of the present invention.
Figure 27B:
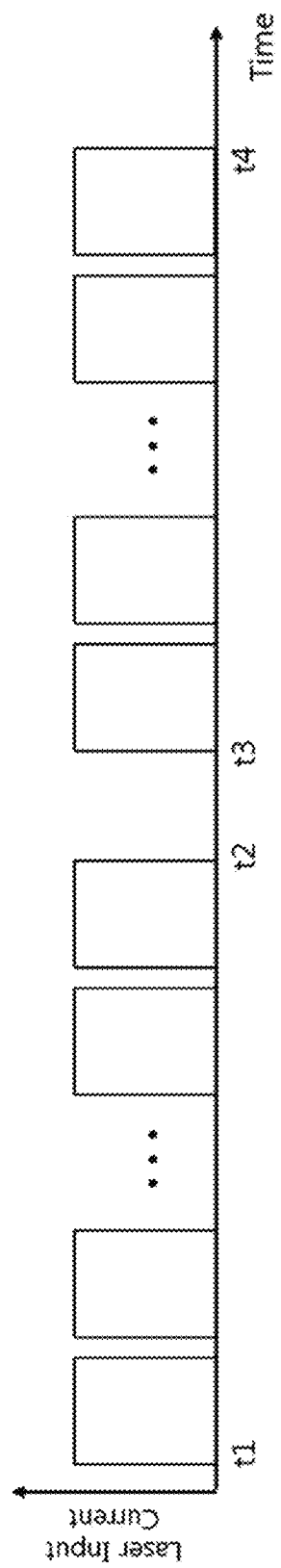
Figure 27C:
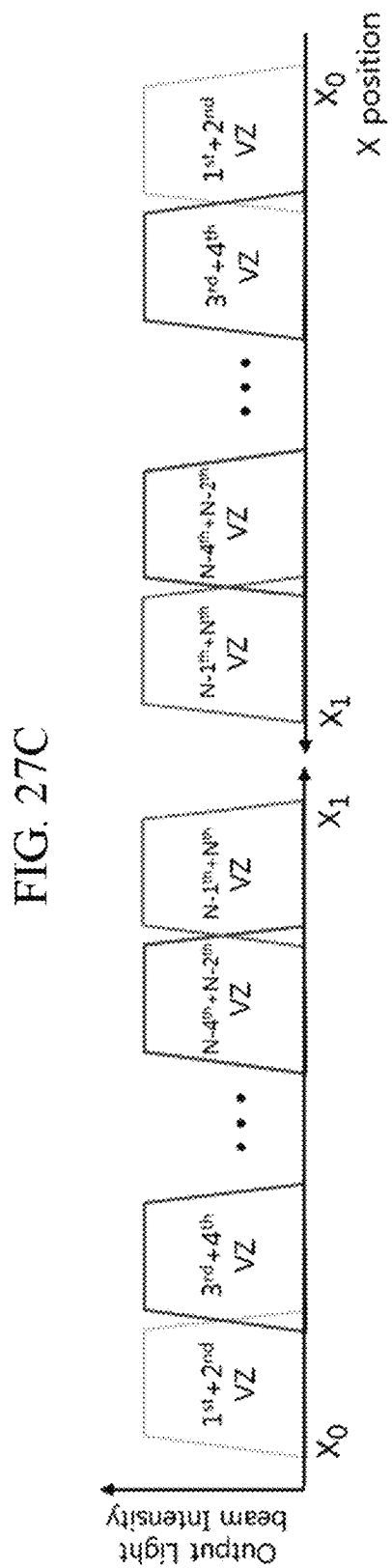

However, even in this case, it is possible to implement 3D images displaying horizontal parallax and whose viewpoint intervals are continuously similar to an average pupil interval. FIGS. 27A, 27B and 27C show a method of forming a combined viewing zone by combining two or more adjacent unit viewing zones formed based on the output unit of one LBS projection optical system in this way, and resultant viewing-zone characteristics at a view position.

There are two methods of combining two adjacent viewing zones in the horizontal direction by operating R, G, and B laser light sources of a unit LBS projection optical system. FIGS. 27A, 27B and 27C are diagrams illustrating a principle of combining two unit viewing zones formed in the horizontal direction into one viewing zone based on a light output unit (i.e., the third optical element 40, e.g., the MEMS mirror) of one unit LBS projection optical system according to an exemplary embodiment of the present invention. FIG. 27A shows input current of laser light sources based on a first method over time, FIG. 27B shows input current of laser light sources based on a second method over time, and FIG. 27C shows the horizontal-direction distribution of viewing zones formed at a viewer position of a unit LBS projection optical system.

First, in consideration of the horizontal-direction resolution (number N of horizontal pixels) of the unit LBS projection optical system and an assigned horizontal scanning time ($\Delta t=t2-t1=t4-t3$), driving current is applied to respective R, G, and B laser light sources at intervals of time T(pixel) (average T(pixel) is $\Delta t/N$) assigned to one pixel (see FIG. 27A). However, when N is a horizontal resolution, it is possible to form a total of N/2 horizontal viewing zones by distributing viewing-zone information sequentially applied to respective horizontal pixels to every two horizontal pixels (see FIG. 27B).

According to another method, driving current may be applied at intervals of time 2*T(pixel) (average 2*T(pixel) is 2*$\Delta t/N$) for halving the horizontal resolution of an LBS projection optical system, and horizontal-direction viewing-zone information synchronized with the driving current is transferred, so that a combined viewing zone may be formed by combining two unit viewing zones as shown in FIG. 27C.

In the above exemplary embodiment, two unit viewing zones are combined into a combined viewing zone, but three or more unit viewing zones may be combined into a combined viewing zone in consideration of the horizontal resolution of a unit LBS projection optical system, the size of a displayed 3D image display picture, and the view range of a viewer.

Such combined viewing zones reduce the number of viewing zones capable of displaying 3D images viewed at a viewer position, but minimize crosstalk between adjacent viewing zones and uniformize the brightness distribution of viewing zones, so that a 3D image display apparatus displaying a clear 3D image whose depth perception is improved may be implemented. Therefore, as occasion demands, it is possible to increase the number of combined viewing zones until the width of a combined viewing zone becomes smaller than an interocular distance at a viewer position.

In a 3D image display apparatus using LBS projection optical systems as described above according to exemplary embodiments of the present invention, an array of the LBS projection optical systems is used, and the beam-projection center points of the respective LBS projection optical systems are configured to be unit 3D pixels (or pixel lines). Therefore, it is possible to configure a 3D image display system that has relaxed limitations on space and size compared to an existing 3D image display system and provides hundreds of viewpoint images or more.

In addition, according to exemplary embodiments of the present invention, it is unnecessary to adjust a focus according to a projection distance, and thus it is very easy to change the configuration of the 3D image display apparatus. Also, a laser beam having image information of each LBS projection optical system forms a 3D viewing zone from the beam-projection center point (an MEMS reflective surface) of each point-like LBS projection optical system to a space, so that the 3D image display system can be easily configured compared to an existing 3D image display system that forms a 3D viewing zone on a screen using several adjacent projection optical systems.

Further, according to exemplary embodiments of the present invention, the brightness distribution of a laser is changed and the driving time of the laser is adjusted using a laser light modulation device (a DOE, a light attenuation filter, etc.), so that a viewing zone is effectively adjusted. Therefore, crosstalk between adjacent viewing zones is minimized or a change in the brightness of an image is minimized during a movement from a viewing zone to an adjacent viewing zone, so that a natural and smooth 3D image can be displayed.

Moreover, in exemplary embodiments of the present invention, intervals between adjacent viewing zones determined according to the range of a view depth direction and the total number of viewpoints are determined according to the design of a 3D image display system, and the widths of respective R, G, and B laser driving pulses of the same LBS projection optical system and intervals between the driving pulses are adjusted, so that an optimal 3D image can be displayed.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A three-dimensional (3D) image display apparatus using laser beam scanning (LBS) projection optical systems, comprising:
   a plurality of LBS projection optical systems arrayed in horizontal and vertical directions;
   an input unit through which a 3D image signal is input; and
   an image signal controller configured to distribute the 3D image signal input through the input unit to the LBS projection optical systems,
   wherein each of the arrayed LBS projection optical systems has a beam-projection center point for outputting light to an outside of the LBS projection optical system, and
   an image projected from the beam-projection center point is a horizontal-parallax image based on the beam-projection center point.

2. The 3D image display apparatus of claim 1, wherein the beam-projection center points of the respective LBS projection optical systems are arrayed at predetermined intervals in the horizontal direction (x-axis direction) to determine a horizontal size of a 3D image picture.

3. The 3D image display apparatus of claim 2, further comprising a screen disposed a predetermined distance away from the array of the plurality of LBS projection optical systems in a depth direction (z-axis direction) and having a vertical-direction (y-axis direction) diffusion characteristic,
   wherein the screen determines a vertical size of the 3D image picture.

4. The 3D image display apparatus of claim 3, wherein the screen has a minor diffusion characteristic in the horizontal direction (x-axis direction).

5. The 3D image display apparatus of claim 2, wherein the beam-projection center points of the respective LBS projection optical systems are arrayed at predetermined intervals in the vertical direction (y-axis direction), and
   a full-parallax image is output from the beam-projection center points of the respective LBS projection optical systems.

6. The 3D image display apparatus of claim 5, further comprising a screen disposed a predetermined distance away from the array of the plurality of LBS projection optical systems in a depth direction (z-axis direction) and having a minor diffusion characteristic in the vertical and horizontal directions.

7. The 3D image display apparatus of claim 2, wherein horizontal-direction (x-axis direction) center optical axes of the beam-projection center points of the plurality of LBS projection optical systems are disposed in a direction (z-axis direction) normal to the screen.

8. The 3D image display apparatus of claim 2, wherein horizontal-direction (x-axis direction) center optical axes of the beam-projection center points of the plurality of LBS projection optical systems are disposed to cross a horizontal center of the screen.

9. The 3D image display apparatus of claim 2, wherein horizontal-direction (x-axis direction) center optical axes of the beam-projection center points of the plurality of LBS projection optical systems are disposed to cross a horizontal center of the screen and equalize distances between the beam-projection center points of the plurality of LBS projection optical systems and the horizontal center of the screen.

10. The 3D image display apparatus of any one of claim 9, wherein vertical center axes of the beam-projection center points of the plurality of LBS projection optical systems are disposed to cross a vertical center of the screen.

11. The 3D image display apparatus of claim 10, wherein shapes of projection images formed on the screen from the beam-projection center points of the respective LBS projection optical systems are adjusted to be quadrangles by controlling vertical-direction keystones of the plurality of LBS projection optical systems.

12. The 3D image display apparatus of claim 1, wherein each of the LBS projection optical systems comprises:
red (R), green (G), and blue (B) laser light sources;
a first driver circuit configured to adjust brightness of each of the R, G, and B laser light sources according to the input image signal;
at least one first optical element configured to converge beams emitted from the respective R, G, and B laser light sources into one beam including pixel information of a color image;
at least one second optical element configured to turn the beam including the pixel information of the color image through the first optical element toward a beam-projection reference point;
a third optical element positioned at the beam-projection reference point and configured to scan the beam including the pixel information of the color image in a raster pattern; and
a fourth optical element positioned between the second optical element and the third optical element, and configured to change a distribution of light intensity of the beam incident from the second optical element so that a horizontal-direction (x-axis direction) light intensity distribution of the beam output through the third optical element has a quadrangular or trapezoidal shape having a flat central portion.

13. The 3D image display apparatus of claim 12, wherein the first optical element is a dichroic mirror having wavelength-specific reflection and transmission characteristics.

14. The 3D image display apparatus of claim 12, wherein the second optical element is a reflection mirror or a prism.

15. The 3D image display apparatus of claim 12, wherein the third optical element is a micro-electro-mechanical system (MEMS) mirror having two axes in the horizontal direction (x-axis direction) and the vertical direction (y-axis direction).

16. The 3D image display apparatus of claim 12, wherein the fourth optical element is a diffractive optical element (DOE) or a holographic optical element (HOE) for beam shaping, or an optical filter for attenuating laser light according to a position in an area of the laser light.

17. The 3D image display apparatus of claim 12, wherein the LBS projection optical system is disposed in front of the third optical element positioned at the beam-projection reference point in a beam path, and further comprises a fifth optical element configured to control the beams to converge on the third optical element so that the beams diverge from the third optical element at a predetermined angle.

18. The 3D image display apparatus of claim 12, wherein the LBS projection optical system is disposed to perform scanning in the horizontal direction (x-axis direction),
the beam output from the third optical element determines one pixel image based on one driving pulse of the R, G, and B laser light sources, and
the horizontal-parallax image is disposed at each horizontal-direction pixel image.

19. The 3D image display apparatus of claim 18, wherein, by adjusting a driving pulse width of the R, G, and B laser light sources of the beam output from the third optical element, a size of a pixel on which a horizontal viewing-zone image formed by the driving pulse at a position predetermined distance away from the screen in the depth direction (z-axis direction) is disposed is adjusted.

20. The 3D image display apparatus of claim 18, wherein, by adjusting a time interval between a first driving pulse and a consecutive second driving pulse of the R, G, and B laser light sources of the beam output from the third optical element, a distance between a first pixel on which a first horizontal viewing-zone image formed by the first driving pulse at a position predetermined distance away from the screen in the depth direction (z-axis direction) is disposed and a second pixel on which a second horizontal viewing-zone image formed by the second driving pulse at a position predetermined distance away from the screen in the depth direction (z-axis direction) is disposed is adjusted.

21. The 3D image display apparatus of claim 12, wherein each of the LBS projection optical systems performs scanning in the vertical direction (y-axis direction) from a first horizontal position (x-axis position) to form a first horizontal viewing-zone image at a position predetermined distance away from the screen in the depth direction (z-axis direction), and performs scanning in the vertical direction (y-axis direction) from a position predetermined distance away from the first horizontal position in the horizontal direction (x-axis direction) to form a second horizontal viewing-zone image at a position predetermined distance away from the screen in the depth direction (z-axis direction).

22. The 3D image display apparatus of claim 12, wherein each of the LBS projection optical systems comprises two or more sets of R, G, and B laser light sources and further comprises two or more laser driver circuits for adjusting brightness of the respective laser light sources to control a 3D parallax image of the beam incident on the third optical element.

23. The 3D image display apparatus of claim 22, wherein the respective LBS projection optical systems are disposed to perform scanning in the horizontal direction (x-axis direction), and
driving pulses generated by the respective laser driver circuits of the two or more sets of R, G, and B laser light sources are sequentially driven over time, so that respective pixel images adjacent in the horizontal direction by the beam output from the third optical element are formed by different sets of R, G, and B laser light sources.

24. The 3D image display apparatus of claim 23, wherein, by adjusting respective widths of driving pulses generated by the respective laser driver circuits of the two or more sets of R, G, and B laser light sources, a size of a pixel on which a horizontal viewing-zone image formed by the driving pulses at a position predetermined distance away from the screen in the depth direction (z-axis direction) is disposed is adjusted.

25. The 3D image display apparatus of claim 12, wherein the LBS projection optical system is disposed to perform scanning in the horizontal direction (x-axis direction),
one pixel image by the beam output from the third optical element is determined by two or more driving pulses of the R, G, and B laser light sources, and
the horizontal-parallax image is disposed at each horizontal-direction pixel image.

26. The 3D image display apparatus of claim 12, wherein the fourth optical element makes a scanning laser light distribution similar to a square viewing zone by removing light outside a full width at half maximum (FWHM) diameter from a Gaussian light distribution.

27. The 3D image display apparatus of claim 26, wherein the fourth optical element has a characteristic of transmitting the beam of an area smaller than the FWHM diameter of the projection beam and equal to or larger than a tenth of the FWHM diameter of the projection beam.

28. The 3D image display apparatus of claim 12, wherein the LBS projection optical system forms a square viewing zone having a horizontal-direction (x-axis direction) beam shape and a vertical-direction (y-axis direction) beam shape whose sizes correspond to each other, and
 a laser input signal is applied for a time ranging from larger than 0% to 30% of a scanning time corresponding to one pixel.

29. A three-dimensional (3D) image display apparatus using laser beam scanning (LBS) projection optical systems, comprising:
 a plurality of LBS projection optical systems arrayed in horizontal and vertical directions, and each having a beam-projection center point for outputting light to an outside of the LBS projection optical system;
 an input unit through which a 3D image signal is input;
 an image signal controller configured to distribute the 3D image signal input through the input unit to the LBS projection optical systems;
 a first optical system disposed a predetermined distance away from the array of the plurality of LBS projection optical systems in a depth direction (z-axis direction);
 a second optical system disposed a predetermined distance away from the first optical system in the depth direction (z-axis direction); and
 a screen disposed a predetermined distance away from the second optical system,
 wherein light output from the beam-projection center points of the respective LBS projection optical systems passes through the first optical system and the second optical system and forms images on the screen, so that an array of 3D image reference points is formed.

30. The 3D image display apparatus of claim 29, wherein the beam-projection center points of the respective LBS projection optical systems are arrayed at predetermined intervals in the horizontal direction (x-axis direction).

31. The 3D image display apparatus of claim 30, wherein the first optical system is composed of a convex lens or a Fresnel lens,
 the second optical system is composed of a cylindrical Frensel lens or a cylindrical convex lens aligned in the vertical direction (y-axis direction),
 the screen has a vertical-direction (y-axis direction) diffusion characteristic, and
 the second optical system determines a vertical size of a 3D image picture, so that beams projected from the beam-projection center points of the respective LBS projection optical systems form a 3D pixel line on the screen.

32. The 3D image display apparatus of claim 31, wherein a size of the 3D image picture formed on the screen is adjusted by adjusting a ratio of a focal length of the first optical system to a horizontal-direction (x-axis direction) focal length of the second optical system.

33. The 3D image display apparatus of claim 29, wherein the beam-projection center points of the respective LBS projection optical systems are arrayed at predetermined intervals in the horizontal direction (x-axis direction) and the vertical direction (y-axis direction).

34. The 3D image display apparatus of claim 33, wherein the first optical system and the second optical system are composed of convex lenses or Fresnel lenses, and
 beams projected from the beam-projection center points of the respective LBS projection optical systems become 3D pixel points on the screen, so that an array of the 3D pixel points on the screen implements a full-parallax image.

35. The 3D image display apparatus of claim 34, wherein a size of a 3D image picture formed on the screen is adjusted by adjusting a ratio of a focal length of the first optical system to a focal length of the second optical system.

* * * * *